(12) United States Patent
Araki et al.

(10) Patent No.: US 7,952,663 B2
(45) Date of Patent: May 31, 2011

(54) LIQUID CRYSTAL DISPLAY DEVICE

(75) Inventors: Chieko Araki, Hitachi (JP); Masaya Adachi, Hitachi (JP); Osamu Itou, Hitachi (JP); Shoichi Hirota, Hitachi (JP); Shinichiro Oka, Hitachi (JP); Jun Tanaka, Kawasaki (JP); Miharu Otani, Yokohama (JP)

(73) Assignee: Hitachi Displays, Ltd., Chiba (JP)

(*) Notice: Subject to any disclaimer, the term of this patent is extended or adjusted under 35 U.S.C. 154(b) by 110 days.

(21) Appl. No.: 12/019,715

(22) Filed: Jan. 25, 2008

(65) Prior Publication Data
US 2008/0239210 A1 Oct. 2, 2008

(30) Foreign Application Priority Data
Mar. 26, 2007 (JP) ................................. 2007-078120

(51) Int. Cl.
*G02F 1/1335* (2006.01)
(52) U.S. Cl. .......................................... 349/114; 349/96
(58) Field of Classification Search .................. None
See application file for complete search history.

(56) References Cited

U.S. PATENT DOCUMENTS

| 7,292,297 B2 * | 11/2007 | Jang et al. ................ 349/114 |
| 2001/0046018 A1 | 11/2001 | Ham |
| 2001/0048496 A1 | 12/2001 | Baek |
| 2002/0159011 A1 * | 10/2002 | Ikeno et al. ............... 349/117 |
| 2005/0185120 A1 * | 8/2005 | Kitoh et al. ............... 349/114 |
| 2005/0264730 A1 * | 12/2005 | Kataoka et al. ............ 349/114 |
| 2006/0001804 A1 * | 1/2006 | Doornkamp ............... 349/114 |
| 2006/0125986 A1 * | 6/2006 | Choo et al. ................ 349/114 |

FOREIGN PATENT DOCUMENTS

| CN | 1561457 | 1/2005 |
| JP | 2002-328370 | 11/2002 |
| JP | 2003-344875 | 12/2003 |
| JP | 2005-134843 | 5/2005 |
| JP | 2005-266778 | 9/2005 |
| JP | 2006-78541 | 3/2006 |
| JP | 2006-171723 | 6/2006 |

(Continued)

OTHER PUBLICATIONS

Partial English Translation for JP 2006-78541 A, (Seiko Epson Corp) Mar. 23, 2006, [online], [retrieved on Jan. 8, 2010] Retrieved from the Industrial Property Digital Library of the Japan Patent Office using Internet <URL: http://www.ipdl.inpit.go.jp/homepg_e.ipdl/>.*

(Continued)

*Primary Examiner* — Omar Rojas
(74) *Attorney, Agent, or Firm* — Antonelli, Terry, Stout & Kraus, LLP.

(57) ABSTRACT

In a transflective liquid crystal display device having a first substrate, a second substrate, a liquid crystal layer disposed between the two substrates and a reflective region and a transmissive region in each pixel; the second substrate has a pixel electrode to drive the liquid crystal layer and a common electrode; the reflective region of the second substrate is formed with an in-cell polarizer between the pixel electrode and common electrode and the reflector. In this invention, the thickness of the liquid crystal layer is set greater in the reflective region than in the transmissive region. The difference in the liquid crystal layer thickness between the reflective region and the transmissive region is provided by forming a step in the first substrate or the second substrate.

16 Claims, 19 Drawing Sheets

FOREIGN PATENT DOCUMENTS

JP   2006-184325   7/2006

OTHER PUBLICATIONS

T. Ohyama et al., "34.2: tn Mode TFT-LCD with In-cell Polarizer", SID 04 Digest pp. 1106-1109 (2004).

I. G. Khan et al., "46.4: Ultra-Thin O-Polarizers' Superiority over E-Polarizers for LCDs", SID 04 Digest pp. 1316-1319 (2004).

Y. Ukai et al., "Current Status and Future Prospect of In-Cell Polarizer Technology", SID 04 Digest, p. 1170-1173, (2004).

* cited by examiner

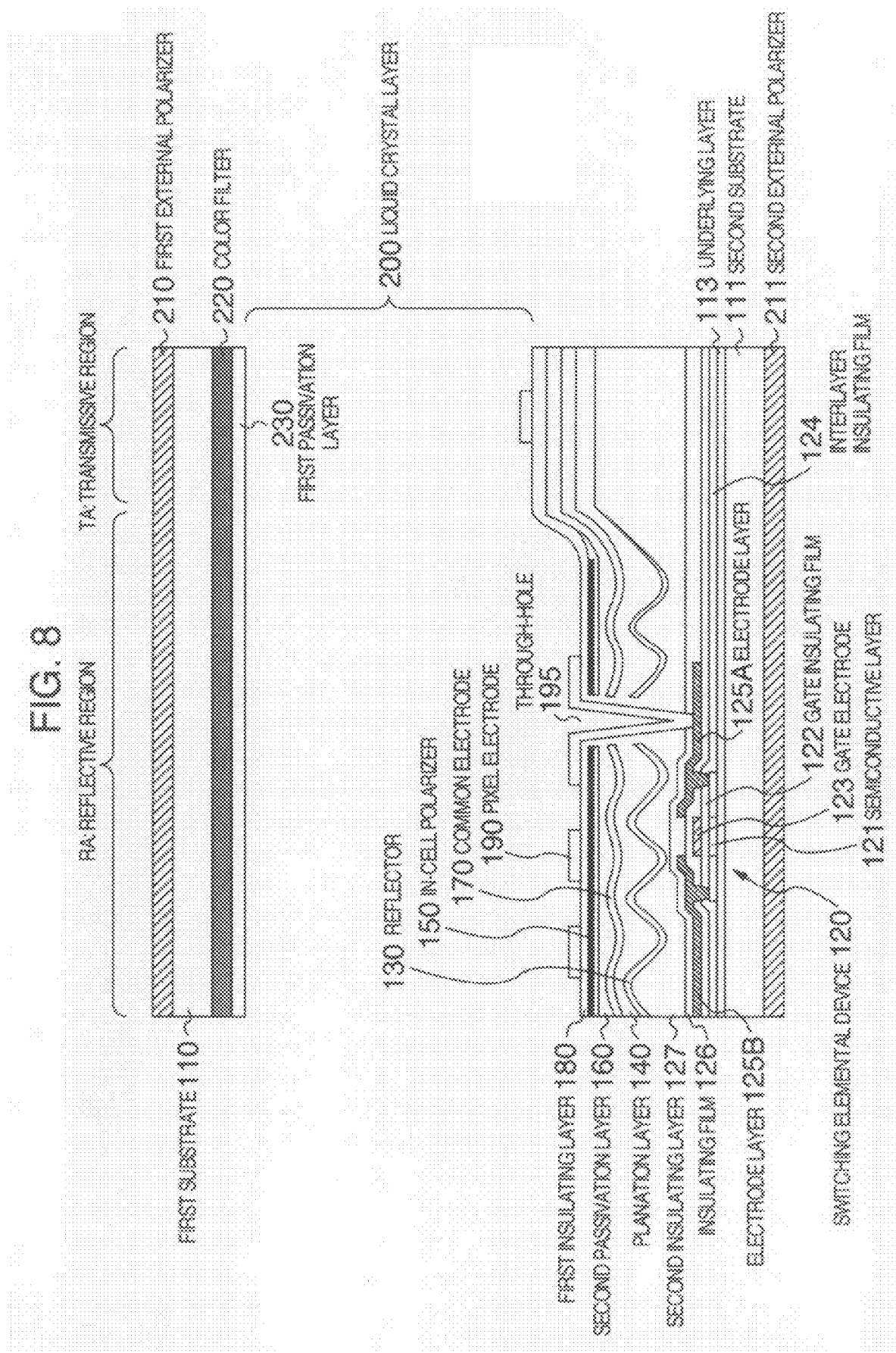

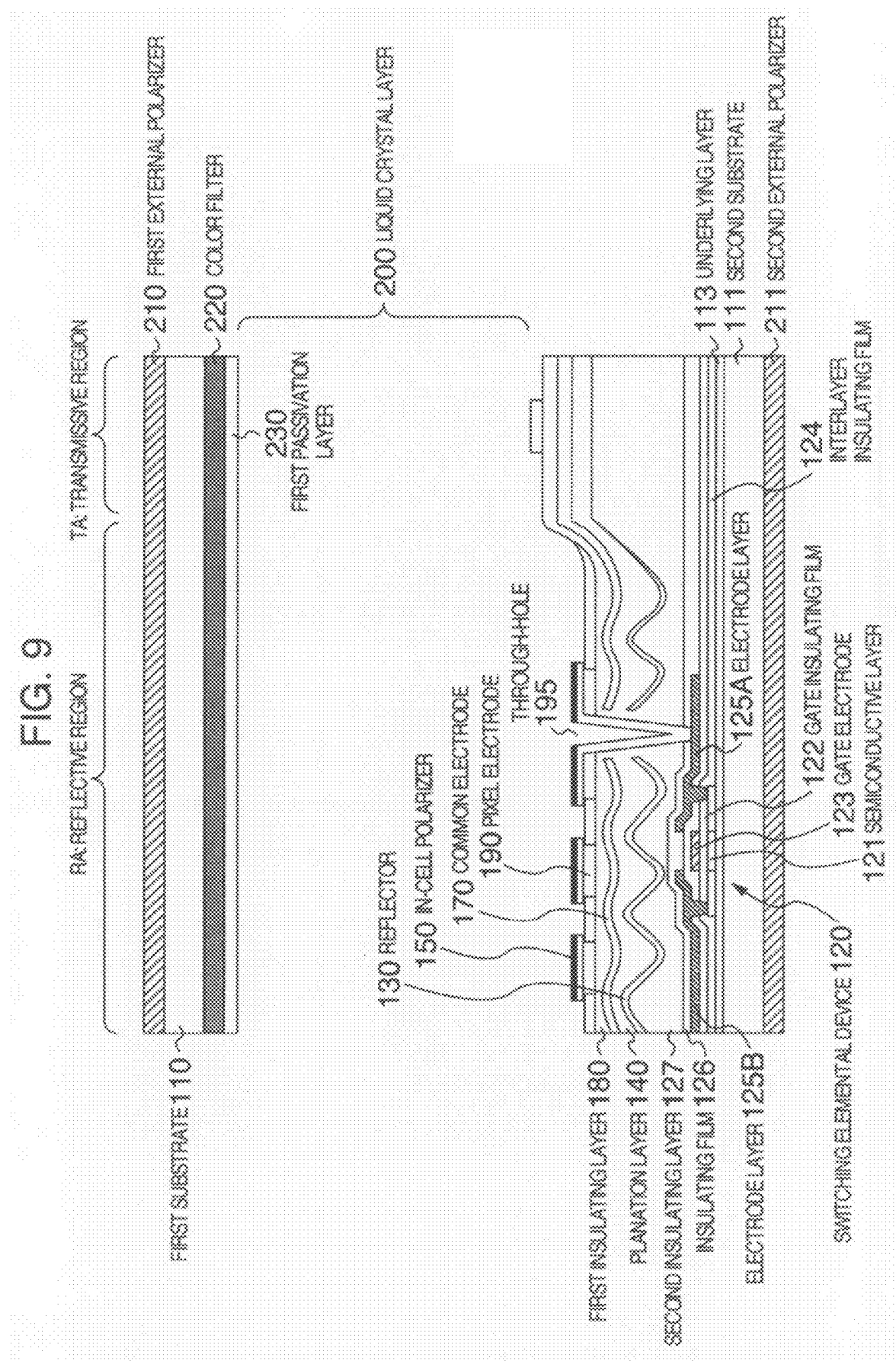

LIQUID CRYSTAL DISPLAY DEVICE

BACKGROUND OF THE INVENTION

The present invention relates to a liquid crystal display device and more particularly to a transflective liquid crystal display device.

Liquid crystal display devices used on mobile devices such as cell phones employ a transflective liquid crystal display device because of its ability to cope with a wide ranging illumination environments. The transflective liquid crystal display device has a transmissive region and a reflective region in each of subpixels that form a display area of a liquid crystal display panel. The transmissive region realizes a transmissive display by controlling the amount of transmitted light from the backlight. The reflective region realizes a reflective display by controlling the amount of reflected light entering from outside. That is, the transflective liquid crystal display device can secure visibility of displayed images mainly by the transmissive display under dark environments and mainly by the reflective display under light environments and therefore can be used in a wide range of illumination environments.

One method of realizing such a transflective liquid crystal display device, or an in-cell polarizer technology, has been proposed which provides a polarizer in each liquid crystal cell in addition to a polarizer installed outside the liquid crystal cell substrate. JP-A-2006-184325 and JP-A-2006-171723 describe a construction of the liquid crystal display device incorporating a polarizer in each liquid crystal cell.

As the digital communication technology advances, an environment is emerging in which moving pictures can be viewed anywhere and anytime. Under these circumstances, demands are growing that users are able to view moving pictures without a stress in a liquid crystal display device mounted on mobile devices. This requires a high-speed response of the liquid crystals. In realizing the high-speed response of the liquid crystals, it is effective to reduce a thickness of the liquid crystal layer.

SUMMARY OF THE INVENTION

In a transflective liquid crystal display device applying the in-cell polarizer technology, light used for display passes through the polarizer four times in the reflective region. In a transflective liquid crystal display device without the in-cell polarizer, on the other hand, light passes through the polarizer only two times even in the reflective region. Since the polarizer absorbs light, the brightness in the reflective region is darker in the transflective liquid crystal display device with the in-cell polarizer than in the transflective liquid crystal display device without it.

To allow the user to view moving pictures without feeling any stress, there is a growing demand for faster response of the liquid crystal. Reducing the thickness of the liquid crystal layer for faster response, however, results in a reduction in the display brightness.

The present invention has been accomplished to solve this problem the conventional technologies have experienced. It is an object of this invention to provide a transflective liquid crystal display device with a bright reflective view and a fast response of the liquid crystal. Other objects, problems and novel features of this invention will become apparent from descriptions in this specification and accompanying drawings.

To achieve the above objective, this invention provides a liquid crystal display device which comprises a first substrate, a second substrate, a liquid crystal layer between the two substrates, and a first polarizer and a second polarizer disposed on an outer sides of the first substrate and the second substrate, respectively, wherein a reflective region and a transmissive region are provided in each pixel, wherein the reflective region of the second substrate is provided with a reflector and an in-cell polarizer between the second substrate and the liquid crystal layer, wherein an absorption axis of the in-cell polarizer is parallel to an absorption axis of the second polarizer, wherein the thickness of the liquid crystal layer is greater in the reflective region than in the transmissive region.

The thickness of the liquid crystal layer satisfies dr>dt and dr=dmax, where dt is a thickness of the liquid crystal layer in the transmissive region, dr is a thickness of the liquid crystal layer in the reflective region RA and dmax is a thickness of the liquid crystal layer that gives the maximum display brightness.

Means other than those described above will become apparent from the following descriptions.

With this invention a transflective liquid crystal display device can be realized which has a bright display in the reflective region and a fast response of liquid crystal.

Other objects, features and advantages of the invention will become apparent from the following description of the embodiments of the invention taken in conjunction with the accompanying drawings.

BRIEF DESCRIPTION OF THE DRAWINGS

FIG. 8 is a schematic cross-sectional view showing a construction of a subpixel in a liquid crystal display panel according to a second embodiment of this invention.

FIG. 9 is a schematic cross-sectional view showing a construction of a subpixel in a liquid crystal display panel according to the second embodiment of this invention.

DETAILED DESCRIPTION OF THE EMBODIMENTS

Now, embodiments of the liquid crystal display device according to the present invention will be explained by referring to the accompanying drawings.

Embodiment 1

Figure 1:
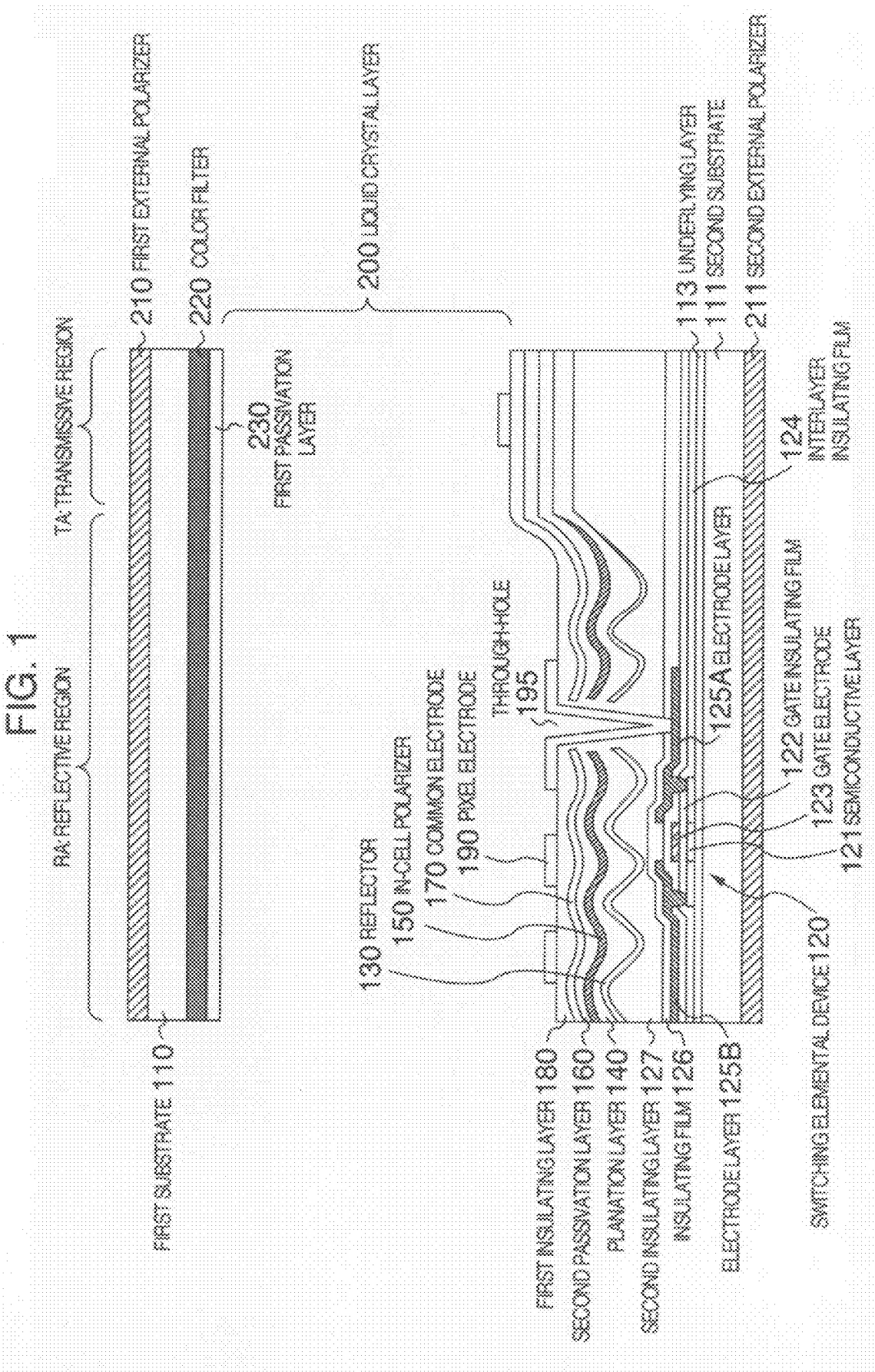
FIG. 1 is a schematic cross-sectional view showing a construction of a subpixel in a liquid crystal display panel according to a first embodiment of this invention.

FIG. 1 is a cross-sectional view showing an outline construction of a main part of a subpixel 100 in a liquid crystal display panel forming the liquid crystal display device of this invention. FIG. 2A is a plan view showing an outline construction of the main part of the subpixel 100 forming the liquid crystal display device of this invention. Here, FIG. 1 schematically shows a cross-sectional structure taken along the line A-A' of FIG. 2A.

Figure 2:
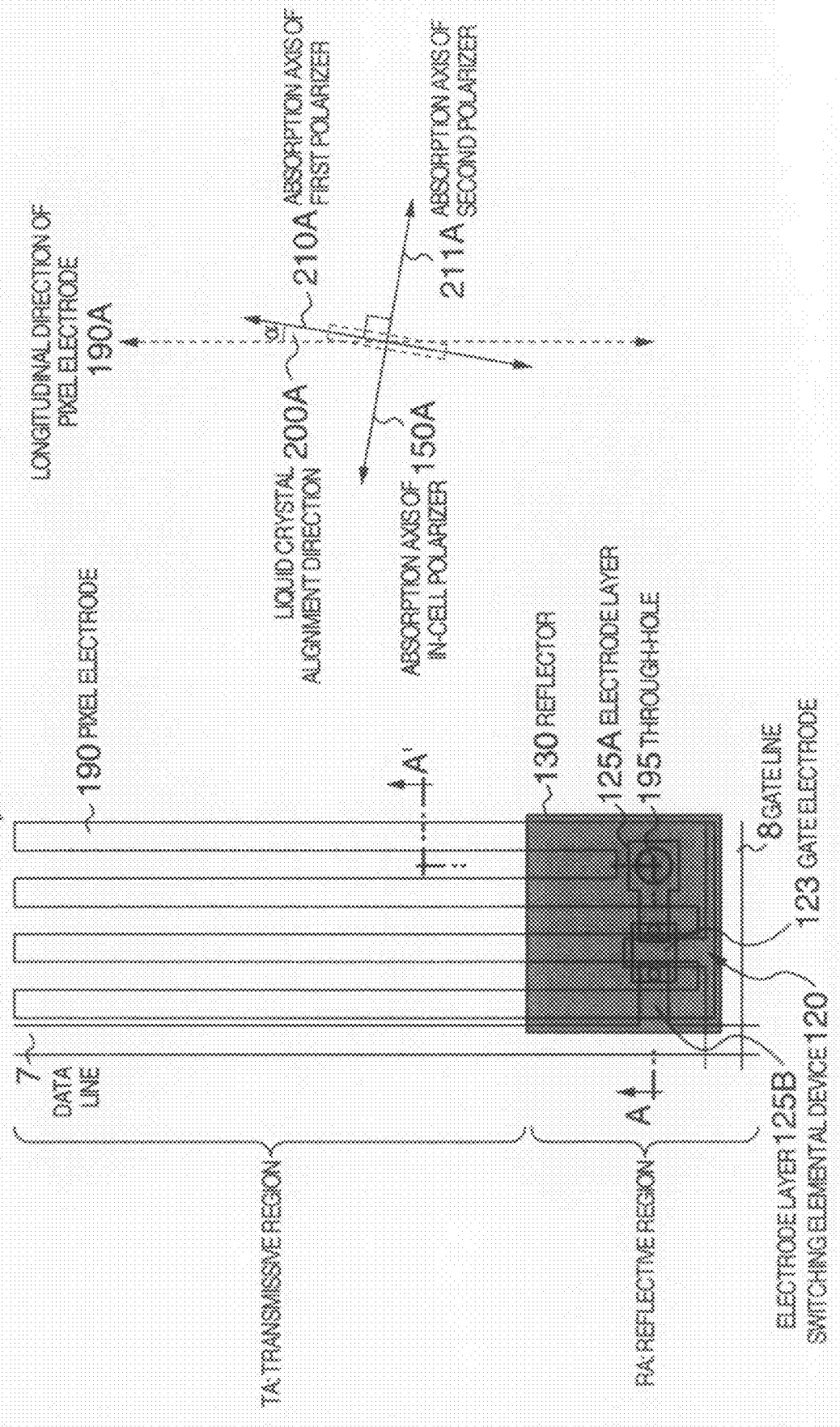
FIG. 2A is a schematic plan view showing a construction of the subpixel in the liquid crystal display panel according to the first embodiment of this invention.
FIG. 2B is a schematic diagram showing axial directions in the subpixel in the liquid crystal display panel according to the first embodiment of this invention.

With reference to FIGS. 1 and 2, the construction of the liquid crystal display device of this invention will be explained. The liquid crystal display device of this invention comprises a liquid crystal display panel and a backlight (not shown) that is disposed at the back of the panel. The backlight illuminates the liquid crystal display panel from behind. The backlight configuration includes an edge light system (light guide plate system), a direct facing system (reflector system) and a planar light source system. An optimal backlight system may be chosen from these and other systems according to its application, purpose and the size of a display area.

Figure 3:
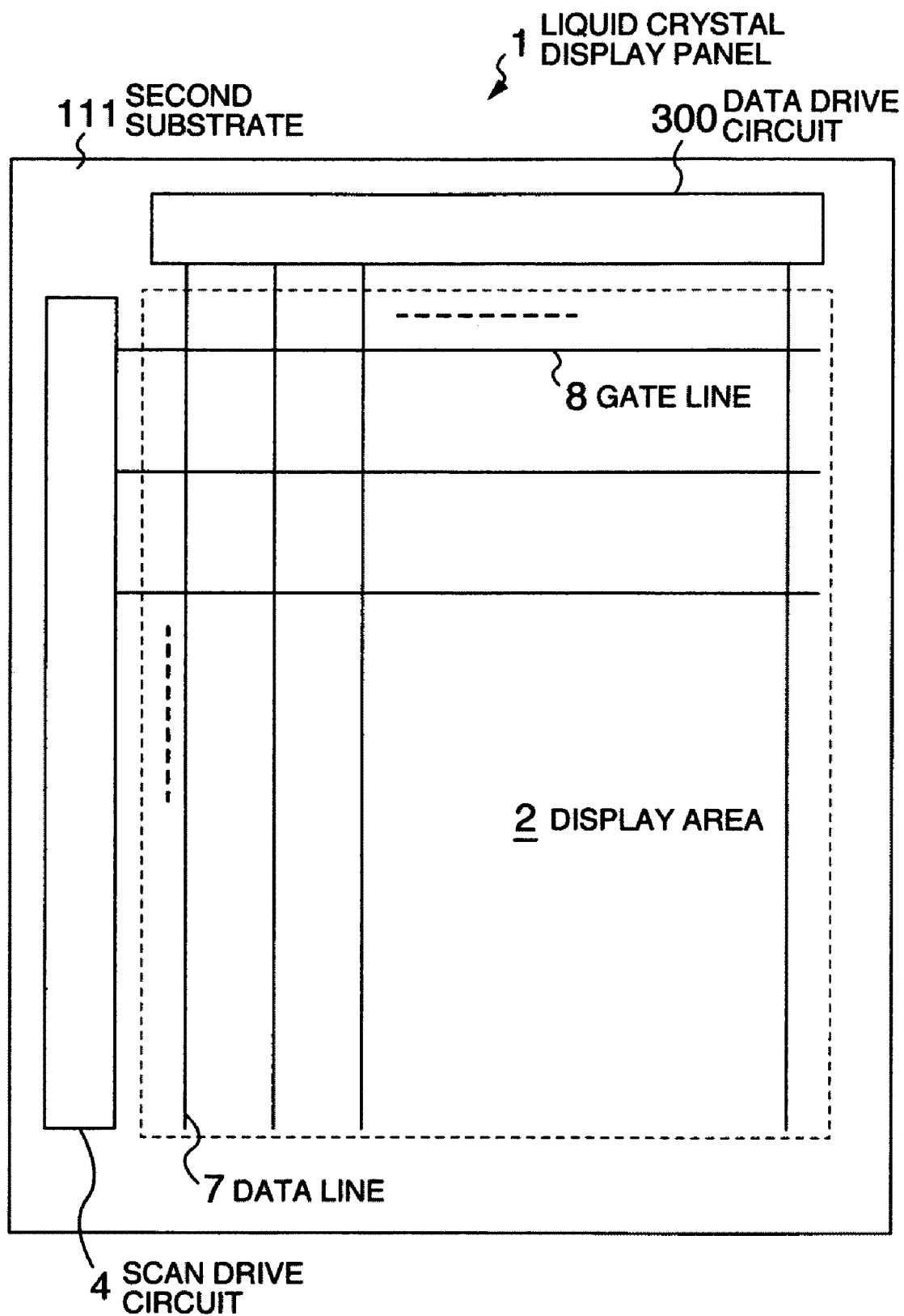
FIG. 3 is a block diagram schematically showing an example of an overall layout of the liquid crystal display panel in the transflective liquid crystal display device of this invention.

FIG. 3 is an example block diagram schematically showing an overall layout of the liquid crystal display panel 1 of the transflective liquid crystal display device according to this invention. As shown in FIG. 3, the liquid crystal display panel 1 has a display area 2 in an area including a central part of a second substrate 111. On the upper side of the display area 2 is arranged a data drive circuit 300 to output an image signal to a data line (signal line) 7. On the left side there is a scan drive circuit 4 for outputting a scan signal to a gate line (scanning line) 8. These drive circuits are composed of shift register circuits, level shifter circuits and analog switch circuits, all formed of complementary circuits of N- and P-channel thin-film transistors. The liquid crystal display panel 1, as in the conventional active-matrix type liquid crystal display panel, has a plurality of gate lines and a plurality of data lines extending in a direction that crosses the gate lines, with subpixels arranged in matrix at intersections between the gate lines and the data lines.

The liquid crystal display device of this invention comprises a liquid crystal display panel and a backlight (not shown) that is installed at the back of the panel. The backlight illuminates the liquid crystal display panel from behind. The backlight is available in three types: an edge light type (optical transmission polymer type), direct facing type (reflector type) and a planar light source type. An optimal type of the backlight 3 may be chosen from these and other types according to its application, purpose and the size of display area.

The liquid crystal display panel 1 forming the liquid crystal display device of this invention, as shown in FIG. 1, comprises a first substrate 110, a second substrate 111, a liquid crystal layer 200 disposed between the first substrate 110 and the second substrate 111, and a first external polarizer 210 disposed on the first substrate 110 on a side opposite to where the liquid crystal layer 200 is provided, and a second external polarizer 211 disposed on the second substrate 111 on a side opposite to where the liquid crystal layer 200 is arranged.

The first substrate 110 and the second substrate 111 have an insulating property and are planar, transparent and optically isotropic. The first substrate 110 and the second substrate 111 are generally formed of glass but a polymer film with improved heat resistance and durability may be used.

On the liquid crystal layer 200 side of the second substrate 111 is provided a switching elemental device 120. The switching elemental device 120 is constructed of thin-film transistors having semiconductor layers of polysilicon, amorphous silicon or organic substance. Although we will take up an example of thin-film transistors of polysilicon, this invention is not limited to this configuration. The switching elemental device 120 constructed of polysilicon thin-film transistors has a gate insulating film 122, a gate electrode 123, a first interlayer insulating film 124, an electrode layer 125A, an electrode layer 125B and a second interlayer insulating film 126 all formed over a polysilicon layer including a semiconductor layer 121 that forms source/drain regions and channel regions.

The gate insulating film 122 and the first interlayer insulating film 124 are made, for example, of SiOx (silicon oxide), and the second interlayer insulating film 126 is made of SiNx (silicon nitride) for example.

The electrode layer 125A and the electrode layer 125B may use a metal electrode material, such as a three-layered film having an aluminum layer vertically sandwiched between titanium (Ti) and tungsten (W). They are not limited to this structure and may also use other materials and structures. The electrode layer 125A and the electrode layer 125B connect to a source region and a drain region of the semiconductor layer 121, respectively, through an opening formed in the first interlayer insulating film 124.

Between the switching elemental device 120 and the second substrate 111 there should preferably be provided an underlying layer 113 to block ions such as Na and K from entering from the transparent substrate into the semiconductor layer 121 and gate insulating film 122. The underlying layer 113 has a structure in which an SiNx layer and an SiOx layer are laminated in this order on the transparent substrate side.

In the transmissive region TA, the first substrate 110 has a color filter 220 and a first passivation layer 230 on the liquid crystal layer 200 side. The second substrate 111 has a second insulating layer 127, a planation layer 140, a second passivation layer 160, a common electrode 170, a first insulating layer 180 and a pixel electrode 190, all laminated thereon in this order on the liquid crystal layer 200 side.

In the reflective region RA, the first substrate 110, as in the transmissive region, has a color filter 220 and a first passivation layer 230 on the liquid crystal layer 200 side. The second substrate 111 has a second insulating layer 127, a reflector 130, a planation layer 140, an in-cell polarizer 150, a second passivation layer 160, a common electrode 170, a first insulating layer 180 and a pixel electrode 190, all laminated thereon in this order on the liquid crystal layer 200 side.

The color filter 220 may use three primary color filters of colors such as red, green and blue for additive color mixing, or three primary color filters of colors such as yellow, magenta and cyan for subtractive color mixing, or any other color filters of a desired color, such as blue-green and yellow-green, that the subpixel of interest is required to transmit.

Since, in the reflective region RA, ambient light passes the color filters two times, the density of color, the thickness of filter or the coverage area may be differentiated between the reflective region RA and the transmissive region TA.

The alignment layer is laminated on the liquid crystal layer 200 side of the color filter 220.

The alignment layer may use a polyimide-based polymer or diamond-like carbon.

The pixel electrode 190 is a transparent electrode made of indium tin oxide (ITO), and the common electrode 170 is also made of the similar transparent electrode. The transparent electrode may be formed of other transparent conductive materials, such as indium zinc oxide (InZnO).

Further, the pixel electrode 190 connects to the electrode layer 125A forming a switching elemental device 120 via a through-hole 195 that passes through the first insulating layer 180, common electrode 170, second passivation layer 160, in-cell polarizer 150, planation layer 140, reflector 130, second insulating layer 127 and second interlayer insulating film 126. The through-hole 195 may be directly covered with the same conductive material as the pixel electrode 190, or an intermediate layer not shown may be provided for improved contact between the electrode material of the pixel electrode 190 and the electrode layer 125A.

The common electrode 170 is formed with an opening at a position corresponding to the through-hole 195 to prevent the common electrode 170 from coming into contact with the pixel electrode 190, i.e., for complete isolation from the pixel electrode.

The pixel electrode 190 is formed in a comb shape, as shown in FIG. 2A.

The reflector 130 need only use a metal material with high reflectance that reflects a visible light, such as aluminum (Al) and silver (Ag).

In this embodiment, the in-cell polarizer 150 is formed over the reflector 130 and below the common electrode 170 in the reflective region RA. Forming the in-cell polarizer 150 over the reflector 130 and below the common electrode 170 prevents a voltage drop that would otherwise be caused by the in-cell polarizer 150 when a voltage is applied between the pixel electrode 190 and the common electrode 170.

Below the in-cell polarizer 150 a planation layer 140 is applied, as required. The planation layer 140 to planate the in-cell polarizer 150 can prevent a possible degradation of the performance of the in-cell polarizer. The in-cell polarizer 150 absorbs linearly polarized light having its vibration plane in a predetermined axial direction but passes a linearly polarized light having its vibration plane in a direction perpendicular to this axis. The in-cell polarizer 150 may be formed, for example, by using and applying a lyotropic liquid crystal dye described in T. Ohyama et al., SID 04 DIGEST pp. 1106-1109 (2004) and (I. G. Khan et al., SID 04 DIGEST pp. 1316-1319 (2004)). The in-cell polarizer may also use a material that, upon being radiated by a linearly polarized light, gives rise to a polarization.

In both the reflective region RA and the transmissive region TA, the common electrode 170 is formed in a layer situated upper than the in-cell polarizer 150. That is, in the transmissive region TA the common electrode 170 is formed regardless of the presence or absence of the in-cell polarizer 150. In this case, the second passivation layer 160 may be provided, as required, at least between the in-cell polarizer 150 and the common electrode 170.

The second passivation layer 160 is provided, as required, to protect the in-cell polarizer 150 from deteriorating in processes after the formation of the in-cell polarizer, or to prevent impurities from oozing out of the in-cell polarizer 150 and contaminating other structures. The second passivation layer 160 should preferably use a material that is transparent to a visible light, such as polyimide- or acrylic-based transparent resin materials, or SiOx (silicon oxide) or SiNx (silicon nitride) transparent organic materials. For a passivation layer, SiNx is particularly preferred because of its capability to form a fine layer.

Even after the in-cell polarizer 150 has been removed from the transmissive region TA by photolithography using a transparent photosensitive resist material, the resist material is left in the reflective region RA over the in-cell polarizer 150 to use it as the second passivation layer 160. This method has an advantage of reducing the number of manufacturing steps.

The liquid crystal display device of this invention is characterized by the fact that the thickness of the liquid crystal layer in the reflective region RA is greater than that of the liquid crystal layer in the transmissive region TA. In this embodiment, the thickness of the second insulating layer 127 formed below the reflector 130 of the second substrate 111 is differentiated between the transmissive region TA and the reflective region RA. The surface of the second insulating layer 127 provides a base on which to form an undulating surface of the reflector 130 in the reflective region RA. Although the undulating surface can be formed by the photolithography, the process of this embodiment makes the insulating layer in the reflective region RA smaller in average thickness than that of the transmissive region TA by removing a greater depth of the insulating layer of the reflective region RA than that of the insulating layer of the transmissive region TA. With the insulating layer of the reflective region RA formed thinner in average than the insulating layer of the transmissive region TA, the thickness of the liquid crystal layer of the reflective region RA is greater than that of the liquid crystal layer of the transmissive region TA. Since the thickness of the liquid crystal layer is differentiated between the reflective region RA and the transmissive region TA, there is no need for additional steps or additional layers.

However, in applying the planation layer 140 over the in-cell polarizer 150, it is required that the step between the transmissive region TA and the reflective region RA must be set larger than a difference in the thickness of the liquid crystal layer 200 between the transmissive region TA and the reflective region RA, because the planation layer 140 has an effect of reducing a step (vertical difference) in the underlying layer Over the first insulating layer 180 and the pixel electrode 190, an alignment layer (not shown) that covers them is formed. The alignment layer, like the alignment layer formed over the first transparent substrate, is made of polyimide-based polymer, diamond-like carbon and so on.

The first substrate 110 and the second substrate 111 are arranged so that their alignment layer formation surfaces oppose each other. The two substrates are bonded together along their circumference by a framelike sealing material with spacers (not shown) installed between them to form a space inside. This space is filled with a nematic liquid crystal with a positive dielectric anisotropy, which is then sealed, thus providing the liquid crystal layer 200. The liquid crystal layer 200 has the alignment direction of long axes of liquid crystal molecules defined by the aligning treatment applied to the alignment layers formed on the first substrate 110 and the second substrate 111. The liquid crystal alignment direction of the liquid crystal layer 200 is a so-called homogeneous alignment with no twist between the two substrates 110, 111.

The alignment direction (liquid crystal alignment direction) 200A of liquid crystal molecules' long axes of the liquid crystal layer 200 is tilted by an angle of $\alpha$ with respect to a longitudinal direction 190A of the pixel electrode, as shown in FIG. 2B. This angle $\alpha$ is set in a range of between ±5 and ±30 degrees and, considering the alignment stability and display brightness, the angle $\alpha$ should preferably be set in a range of between ±7 and ±15 degrees.

An absorption axis 210A of the first external polarizer 210 and an absorption axis 211A of the second external polarizer 211 are set perpendicular to each other. The alignment direction (liquid crystal alignment direction) 200A of the liquid crystal molecules' long axes of the liquid crystal layer 200 is set parallel to or perpendicular to the absorption axis 210A of the first external polarizer 210. Further, in the transflective liquid crystal display device of this invention, an absorption axis 150A of the in-cell polarizer is set parallel to the absorption axis 211A of the second external polarizer 211.

As shown in FIG. 2B, the longitudinal direction 190A of the pixel electrode is parallel to the direction in which the data line 7 extends. The absorption axis 210A of the first external polarizer 210 and the liquid crystal alignment direction 200A are both tilted by an angle of $\alpha$ (for instance 10 degrees) with respect to the longitudinal direction 190A of the pixel electrode. The absorption axis 211A of the second external polarizer 211 and the absorption axis 150A of the in-cell polarizer 150 are both set perpendicular to the absorption axis 210A of the first external polarizer 210 and the liquid crystal alignment direction 200A.

When the in-cell polarizer 150 uses a material described in, for example, Y. Ukai et al., "Current Status and Future Prospect of In-Cell Polarizer Technology", SID 04 DIGEST, p 1170-1173, 2004, the direction of application of the material needs to be set at an angle of $\alpha$ against the longitudinal direction of the pixel electrode.

Figure 4:
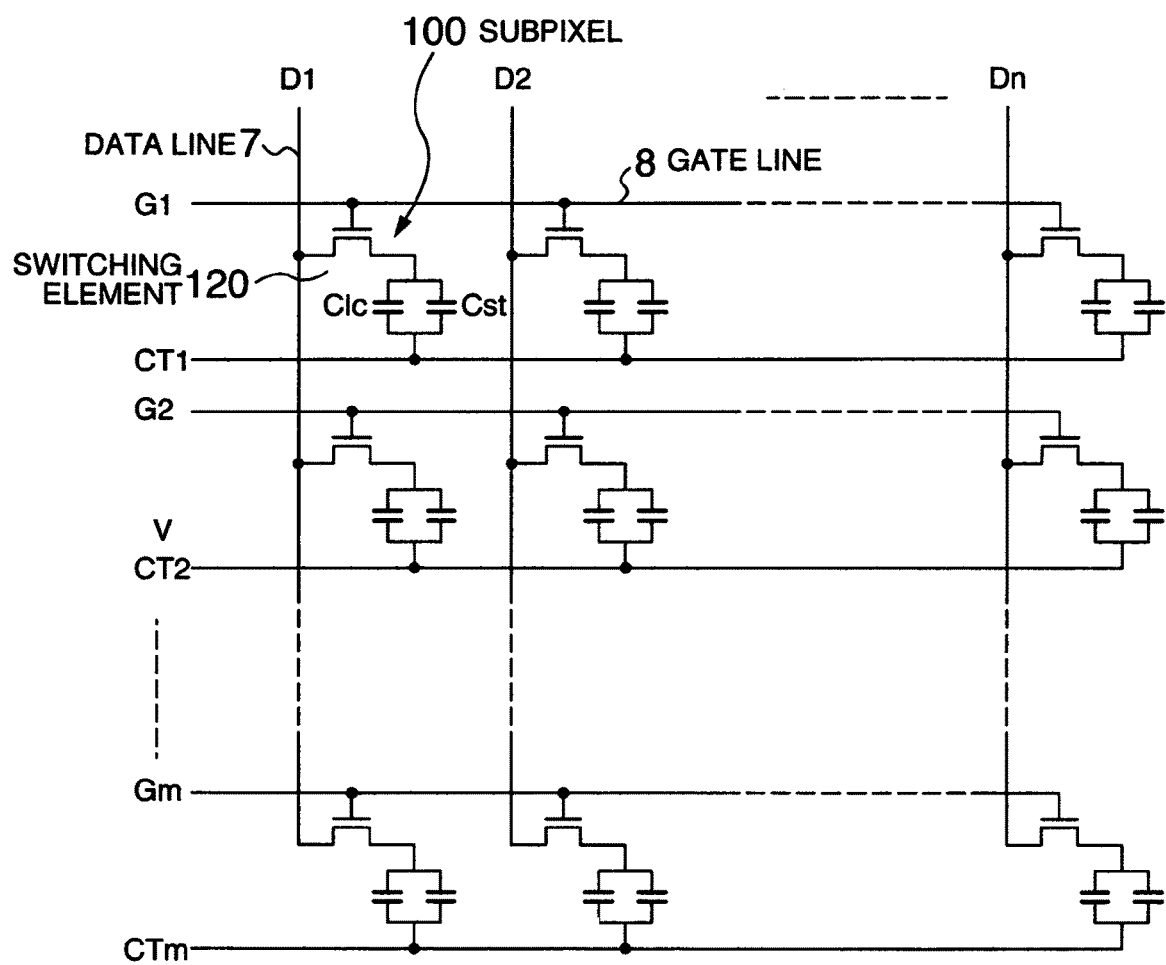
FIG. 4 is an equivalent circuit diagram of an active matrix built in a display area 2 of the liquid crystal display panel 1 in the transflective liquid crystal display device of this invention.

FIG. 4 is an equivalent circuit of an active matrix constructed in a display area 2 of the liquid crystal display panel 1 in the transflective liquid crystal display device of this invention. The liquid crystal display panel 1, as with the conventional active matrix type liquid crystal display panel, has a plurality of gate lines, a plurality of data lines extending in a direction crossing the gate lines, and a matrix of subpixels 100 formed at intersections between m gate lines G1, G2, ..., Gm and n data lines D1, D2, ..., Dn. The common electrode needs only to be formed to extend in the same direction as the gate lines and, in FIG. 4, is shown as m common electrodes CT1, CT2, ..., CTm. Alternatively, m common potential wires may be formed to extend in the same direction as the gate lines and connected to the common electrodes formed in the individual subpixels. Or the common electrode may be formed to cover the entire display area excluding the unnecessary portions, such as through-holes. In either case, the common electrode needs only to be connected so as to be controlled at a predetermined voltage.

In the equivalent circuitry, each subpixel has a capacitive element (storage capacity) Cst formed by the pixel electrode, the common electrode and the first insulating layer 180 between these electrodes, a capacitive element Clc formed by the liquid crystal layer, and a switching elemental device 120.

The subpixels are driven by supplying a turn-on voltage (scan signal) successively to the m gate lines beginning with the first gate line G1 in one frame period. As the switching elemental device 120 turns on by the scan signal, a voltage corresponding to the image signal is supplied from the data line 7 through the switching elemental device 120 to the pixel electrode. That is, while a turn-on voltage is being supplied to a certain gate line, all the switching elemental devices connected to that data line are turned on, supplying data voltages to the n data lines at one time. The method of driving the liquid crystal display panel 1 is the same as that of the conventional active matrix type IPS liquid crystal display device, and therefore its detailed explanation is omitted here.

Figure 5:
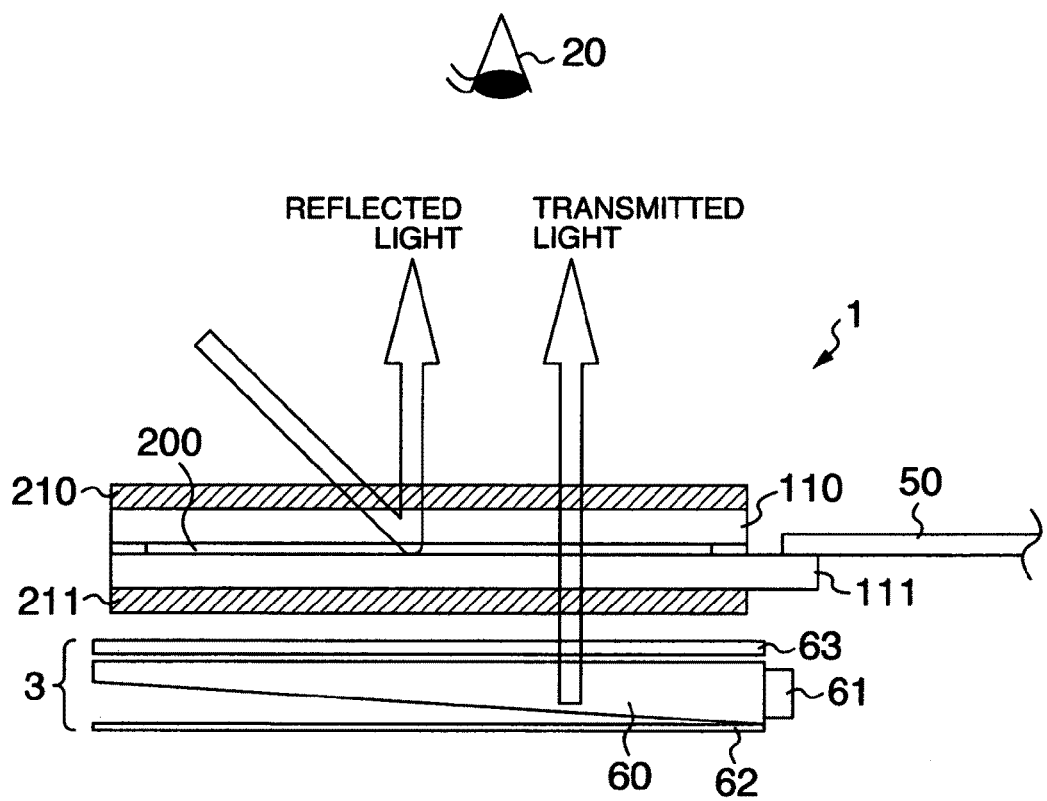
FIG. 5 is a schematic cross-sectional view showing a construction of a main part of the transflective liquid crystal display device of this invention.

FIG. 5 is a schematic cross-sectional view showing a structure of a main part of the transflective liquid crystal display device of this invention. The transflective liquid crystal display device comprises a liquid crystal display panel 1 and a backlight 3 disposed at the back of the panel.

As described above, the liquid crystal display panel 1 has the first substrate 110 and the second substrate 111. Generally, the second substrate 111 is greater than the first substrate 110 and has, on its inner surface on the first substrate 110 side, an area which is not covered by the first substrate 110 and is connected to an external circuit to receive video information such as an image signal in the form of an electric signal. That is, the liquid crystal display panel 1 has a flexible printed circuit board (FPC) 50 in an area of the second substrate 111 that is not covered by the first substrate 110. Through this FPC 50 the liquid crystal display panel 1 is electrically connected to an external circuit. In this area a semiconductor chip (not shown) may be mounted which functions as a driver, as required.

The backlight 3 illuminates the display area of the liquid crystal display panel 1 from the back. The backlight 3 is available in various types, such as an edge light system (light guide plate system), a direct facing system (reflector system) and a planar light source system. An optimal backlight system may be chosen from these and other systems according to its application, purpose and the size of a display area. Although the edge light type backlight is taken up for explanation, this invention is not limited to this type of backlight.

The backlight 3 comprises an light guide plate 60 formed with a means for changing the direction of propagation of light, such as white pigment printed dots on the back, fine undulations and lens formations; a light source 61 disposed at an end face of the light guide plate 60; a reflective sheet 62 arranged at the back of the light guide plate 60; and an optical film 63 such as a prism sheet and a scattering sheet disposed on the front side of the light guide plate 60.

The light source 61 may use a linear light source such as cold and hot cathode tubes and a spot light source such as light emitting diodes (LEDs). Although we take up LEDs as the light source 61 in the following explanation, it should be noted that the present invention is not limited to this conFIGu- ration. When LEDs are used as the light source 61, it is better that a reflector (not shown) is provided or a molded resin formed around the light emitting part of the LEDs is improved in shape to enable light from the light source to enter into the light guide plate 60 with high efficiency.

In this construction, light emitted from the light source 61 and entering into the light guide plate 60 is totally reflected inside the light guide plate 60 as it travels in the resin. Of the rays of light propagating inside the light guide plate 60, those that have reached a means provided at the back of the optical transmission resin that changes the direction of light, have their directions changed and leave the light guide plate 60 from the front side. The rays of light that have left the light guide plate 60, after being adjusted in the distribution of emission angle and in-plane brightness distribution, are thrown onto the liquid crystal display panel 1.

Next, the operation of the transmissive region and the reflective region in the panel construction of this embodiment will be explained.

In the transmissive region TA, the operation is as follows. Of the rays of light emitted from the backlight and thrown onto the liquid crystal display panel, those entering the transmissive region TA passes through the second external polarizer 211 and the liquid crystal layer 200 and enters the first external polarizer 210. At this time, if the drive voltage is 0 V, i.e., if there is no potential difference between the pixel electrode and the common electrode and thus no electric field is formed, the alignment direction of liquid crystal molecules remains unchanged, maintaining the polarized state of the light passing through the liquid crystal layer 200. Thus, light that has passed through the liquid crystal layer 200 is absorbed by the first external polarizer 210, resulting in a black mode.

When a predetermined drive voltage is applied to the pixel electrode to form a certain electric field between the pixel electrode and the common electrode, the alignment direction of liquid crystals changes, so that light passing through the second external polarizer and entering the liquid crystal layer changes its polarized state as it passes through the liquid crystal layer 200. Thus, the amount of light that passes through the first external polarizer 210 corresponds to a change in the polarized state of the liquid crystal layer 200, so that a desired brightness is obtained. Thus, when the drive voltage is zero, a black (dark) mode is displayed; and when a predetermined drive voltage is applied, a light mode is displayed. This operation is a so-called normally black display mode.

In the reflective region RA, the operation is as follows. External light that enters the reflective region RA of the liquid crystal display panel from the front side passes through the first external polarizer 210 and then the liquid crystal layer 200 before entering the in-cell polarizer 150.

If the drive voltage is 0 V, i.e., there is no potential difference between the pixel electrode and the common electrode, the alignment direction of liquid crystal molecules remains unchanged, so that the polarized state of light is maintained as it passes through the liquid crystal layer 200. Therefore, the most of the light passing through the liquid crystal layer 200 is absorbed by the in-cell polarizer 150 and no light is reflected toward the outside, resulting in a black (dark) mode.

On the other hand, if a predetermined voltage is applied to the pixel electrode to form a predetermined electric field between the pixel electrode and the common electrode, the liquid crystal alignment direction changes, causing a change in the polarized state that the light undergoes as it passes through the liquid crystal layer 200. Therefore, the amount of light that passes through the in-cell polarizer 150 to enter the reflector 130 corresponds to a change in the polarized state of the liquid crystal layer. The light incident on the reflector 130 is reflected by the reflector 130 and re-enters the in-cell polarizer 150. The polarized state of light that has been reflected by the reflector 130 and has passed through the in-cell polarizer 150 is mostly maintained. So, most of the light that re-enters the in-cell polarizer 150 passes through it and then the liquid crystal layer 200 before entering the first external polarizer 210. In this case, the polarized state of light similarly changes as it passes through the liquid crystal layer 200. The amount of light that passes through the first external polarizer 210 corresponds to a change in the polarized state of the liquid crystal layer 200, so that a desired brightness is produced. Thus, when the drive voltage is zero, a black (dark) mode is displayed; and when a predetermined drive voltage is applied, a light mode is displayed. This operation is a so-called normally black reflective display mode.

Here, a relation between a retardation $\Delta$nd of the liquid crystals and a transmittance and a reflectance will be addressed.

Figure 6:
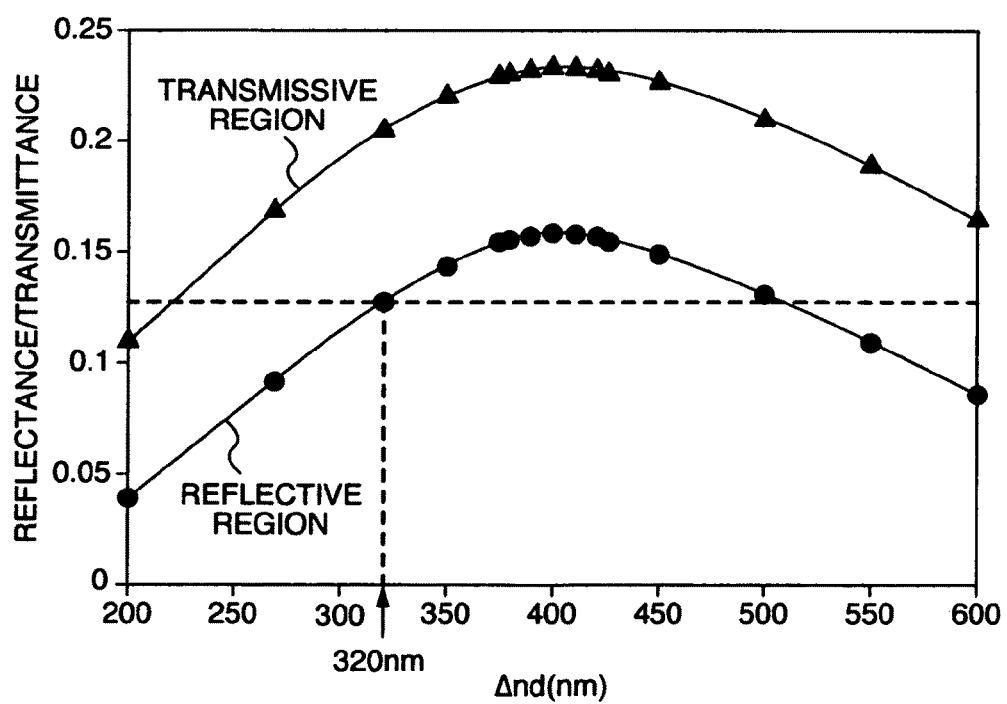
FIG. 6 is a graph showing an example relation between retardations in the reflective region and the transmissive region of the transflective liquid crystal display device of this invention and transmittance/reflectance when a drive voltage of 4 V is applied.

FIG. 6 shows an example relation between a retardation of the transflective liquid crystal display device of this invention, $\Delta$nd (a value equal to the refractive index anisotropy of the liquid crystal layer, $\Delta$n, multiplied by the thickness of the liquid crystal layer, d) and a transmittance and reflectance of the liquid crystal layer. In FIG. 6, characteristics of the reflective region and the transmissive region are shown, with the retardation $\Delta$nd (nm) represented by horizontal axis and the reflectance or transmittance by vertical axis. In FIG. 6, since the refractive index anisotropy $\Delta$n of the liquid crystal material is set to a constant of 0.1, a change in retardation is equivalent to a change in liquid crystal layer thickness d. FIG. 6 shows that a value of the retardation $\Delta$nd that makes the reflectance and transmittance maximum is 400 nm. It is therefore seen that when the thickness of the liquid crystal layer d is 4 µm, the reflectance and transmittance are maximum. That is, there is a thickness of the liquid crystal layer dmax that makes the display brightness maximum. It is known that the thickness of the liquid crystal layer influences its response time and that as the thickness of the liquid crystal layer is reduced, the response time of the liquid crystal decreases. To reduce stresses the user feels when he or she views a moving picture, the liquid crystal layer should preferably be reduced in thickness to shorten the response time of the liquid crystal.

Therefore, to ensure that the brightness of the liquid crystal display and the response of moving pictures are compatible with each other, both of them need to be considered in determining the thickness of the liquid crystal layer in the transmissive region and the reflective region.

When the transmissive region and the reflective region are compared, the transmissive region is generally required to attain a higher quality image with better color purity and higher contrast. Accordingly, in displaying moving pictures, it is desired that the transmissive region have a fast response. In the reflective region, on the other hand, since the polarizer 150 is disposed in each liquid crystal cell, as shown in FIG. 1, light passes through the polarizer four times and thus the amount of light that can be extracted is theoretically small. Therefore, in the reflective region, a priority is given to a brightness improvement over the fast response. Considering the requirements for the transmissive region and the reflective region, this invention employs a construction in which the liquid crystal layer 200 is thicker in the reflective region RA than in the transmissive region TA in order to establish both the high speed response in the transmissive region and the bright display in the reflective region. That is, the construction satisfies the condition of dr>dt, where dt is the thickness of liquid crystal layer in the transmissive region TA and dr is the thickness of liquid crystal layer in the reflective region RA. Here, it is desired that the thickness of liquid crystal layer in the reflective region RA is set equal to the thickness of liquid crystal layer dmax that corresponds to the maximum brightness, in order to establish both the high speed response of the liquid crystal in the transmissive region and the bright display in the reflective region.

It is therefore desired that the construction of the liquid crystal display device of this invention is able to meet the conditions of dr>dt and dr=dmax.

Figure 7A:
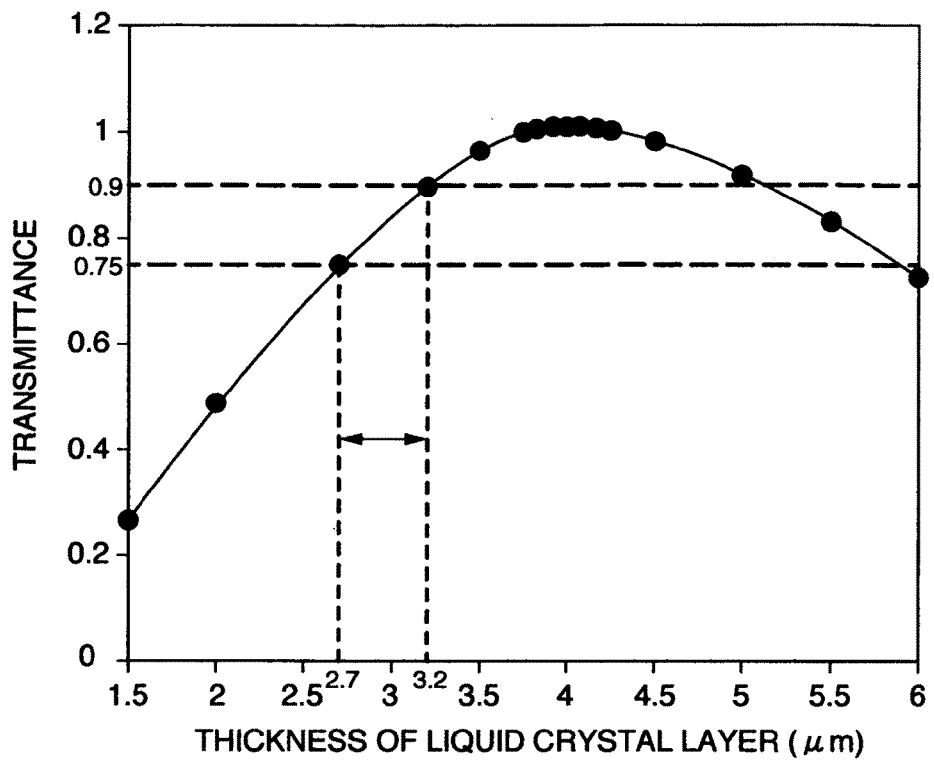
FIG. 7A is a graph showing an example relation between the thicknesses of a liquid crystal layer in the reflective region and the transmissive region in the transflective liquid crystal display device of this invention and transmittance when a drive voltage of 4 V is applied.

Example optimal thicknesses of the liquid crystal layers in the transmissive region and the reflective region will be explained by referring to FIG. 7. FIG. 7A shows characteristics of the transmissive region, with horizontal axis representing liquid crystal layer thickness (μm) and vertical axis representing transmittance. The maximum value of transmittance on the vertical axis is 1.

As can be seen from FIG. 7A, from the standpoint of transmittance, the thickness of the liquid crystal is preferably around 4 μm. This thickness, however, cannot ensure a sufficient response speed in the transmissive region. So, this embodiment adopts a construction in which the transmittance is kept in a range of between 75% and 90% of the maximum value and the thickness of the liquid crystal layer is reduced in accordance with it. As shown by dashed lines in the drawing, the thickness of the liquid crystal layer is set in a range of between 2.7 μm and 3.2 μm.

Figure 7B:
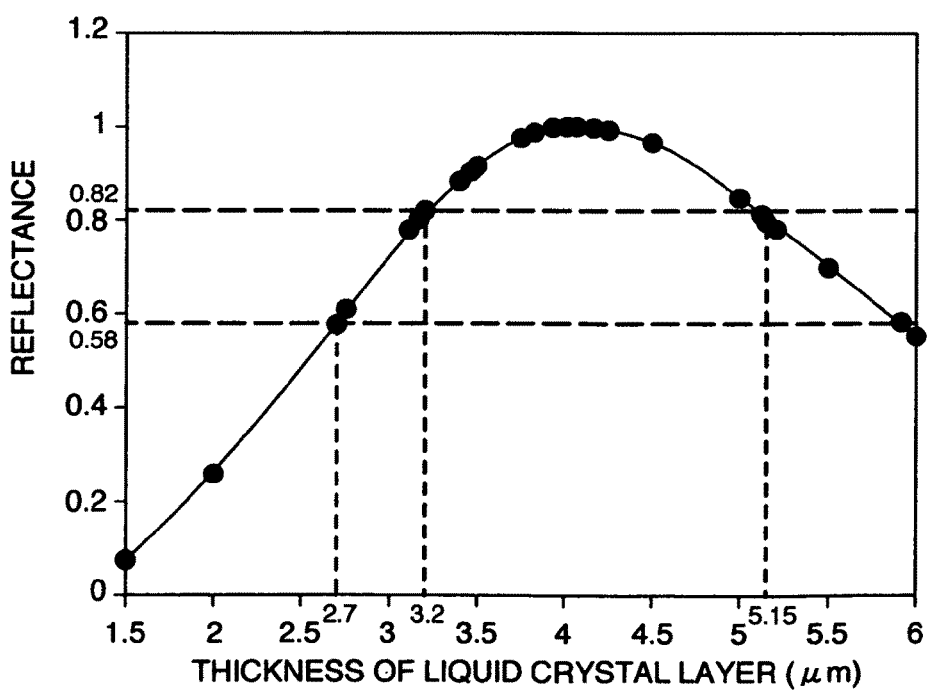
FIG. 7B is a graph showing an example relation between the thicknesses of a liquid crystal layer in the reflective region and the transmissive region in the transflective liquid crystal display device of this invention and reflectance when a drive voltage of 4 V is applied.

In the reflective region shown in FIG. 7B, setting the liquid crystal layer thickness in the same range of 2.7 μm to 3.2 μm as in the transmissive region would result in a reflectance being in a range of between 58% and 82% of the maximum. From the reasons described above, this reflectance cannot assure an enough amount of light in the reflective region. So, in the reflective region, a higher priority is given to the amount of light extracted and the liquid crystal layer thickness is set in a range of between 3.2 μm and 5.15 μm. The relation between the liquid crystal layer thickness dt in the transmissive region and the liquid crystal layer thickness dr in the reflective region is given by 1.6 dt>dr>dt.

In the liquid crystal display device of this invention, as described above, by making the thickness of the liquid crystal layer in the reflective region greater than that of the liquid crystal layer in the transmissive region, a transflective liquid crystal display device can be realized which is bright in the reflective region and has a fast liquid crystal response in the transmissive region.

Embodiment 2

Next, a second embodiment of the liquid crystal display device according to this invention will be explained by referring to FIG. 8 and FIG. 9.

FIG. 8 and FIG. 9 are both schematic cross-sectional views showing constructions of a main portion of a subpixel 100 in a liquid crystal display panel forming the liquid crystal display device of this embodiment.

The construction of FIG. 8 differs from that of the first embodiment shown in FIG. 1 in that the in-cell polarizer 150 provided on the liquid crystal layer 200 side of the second substrate 111 is formed between the pixel electrode 190 and the common electrode 170. The construction of FIG. 9 differs from that of the first embodiment shown in FIG. 1 in that the in-cell polarizer 150 provided on the liquid crystal layer 200 side of the second substrate 111 is formed between the pixel electrode 190 and the liquid crystal layer 200. In other respects the constructions of FIG. 8 and FIG. 9 are similar to that of FIG. 1.

As described above, by changing the location of the in-cell polarizer 150, the number of steps required in the fabricating process of the liquid crystal panel can be reduced.

In the construction of FIG. 8, when the in-cell polarizer 150 is removed from the transmissive region TA by the photolithography, a transparent, photosensitive resist material is used. This makes it possible to leave this resist material over the in-cell polarizer 150 in the reflective region RA even after the in-cell polarizer 150 has been removed from the transmissive region TA and to use the remaining resist material as the first insulating layer 180.

In the construction of FIG. 9, when the in-cell polarizer 150 is removed from the transmissive region TA by the photolithography, a transparent, photosensitive resist material is used. This makes it possible to leave this resist material over the in-cell polarizer 150 in the reflective region RA even after the in-cell polarizer 150 has been removed from the transmissive region TA and to use the remaining resist material as the alignment layer for the liquid crystal. This can also reduce the number of layers formed, such as passivation layers.

The constructions of FIG. 8 and FIG. 9 described above offer an advantage of being able to reduce the number of fabrication steps in addition to the advantageous effects produced by embodiment 1.

Embodiment 3

Next, a third embodiment of the liquid crystal display device according to this invention will be explained by referring to FIG. 10 to FIG. 16. In this embodiment, example constructions to differentiate the thickness of the liquid crystal layer between the transmissive region and the reflective region will be explained.

Figure 10:
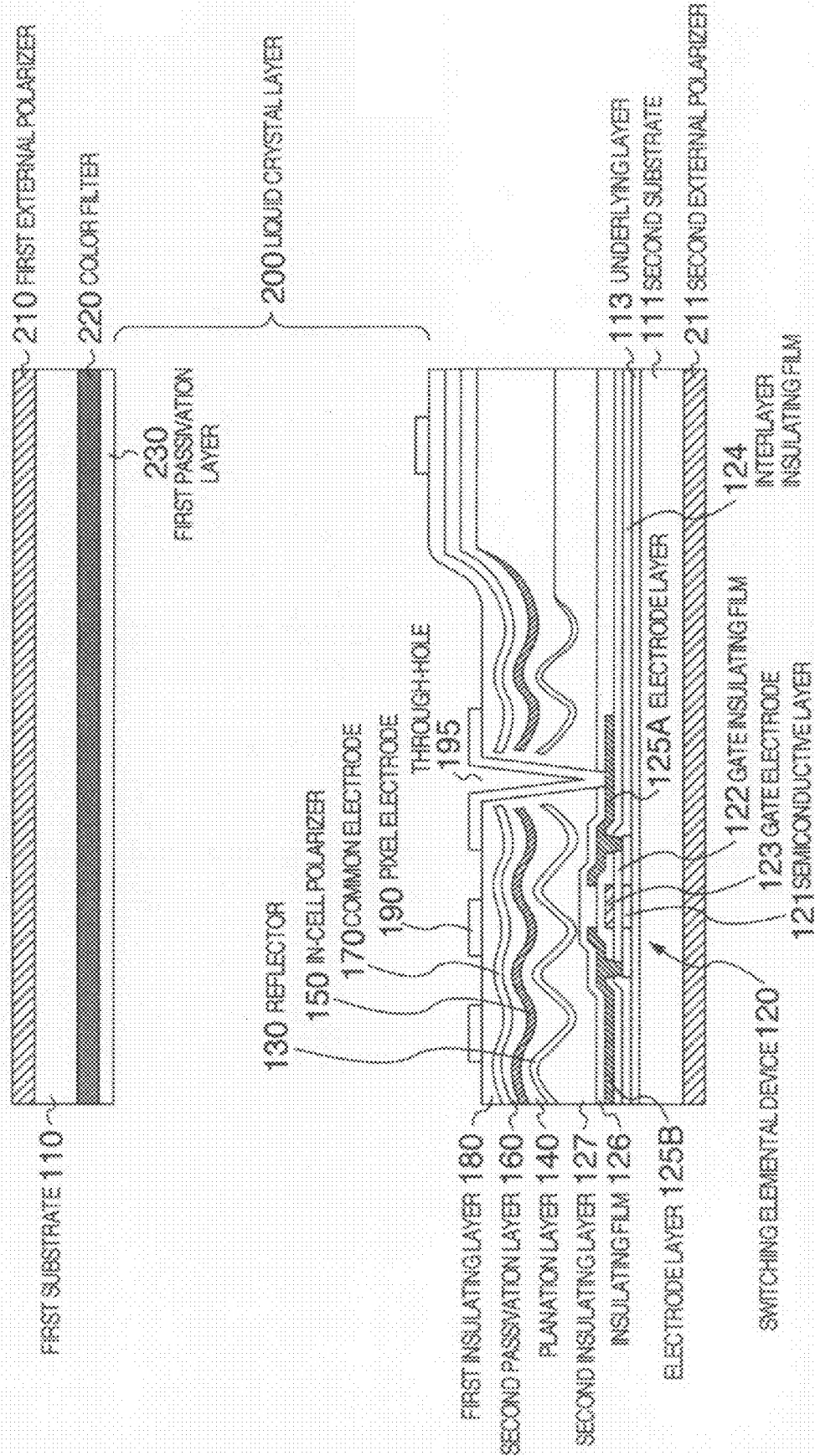
FIG. 10 is a schematic cross-sectional view showing a construction of a subpixel in a liquid crystal display panel according to a third embodiment of this invention.

FIG. 10 is a schematic cross-sectional view showing a construction of a main part of a subpixel 100 in a liquid crystal display panel forming the liquid crystal display device of this embodiment. The liquid crystal display device differentiates the thickness of the liquid crystal layer between the transmissive region TA and the reflective region RA by differentiating the thickness of the planation layer 140 between the reflector 130 and the in-cell polarizer 150. In other respects, the construction of this embodiment is similar to that of the liquid crystal display device of embodiment 1. In this construction, the planation layer applied to the entire surface is removed more from the reflective region RA by the photolithography to make the planation layer 140 in the transmissive region TA thicker than that in the reflective region RA.

Figure 11:
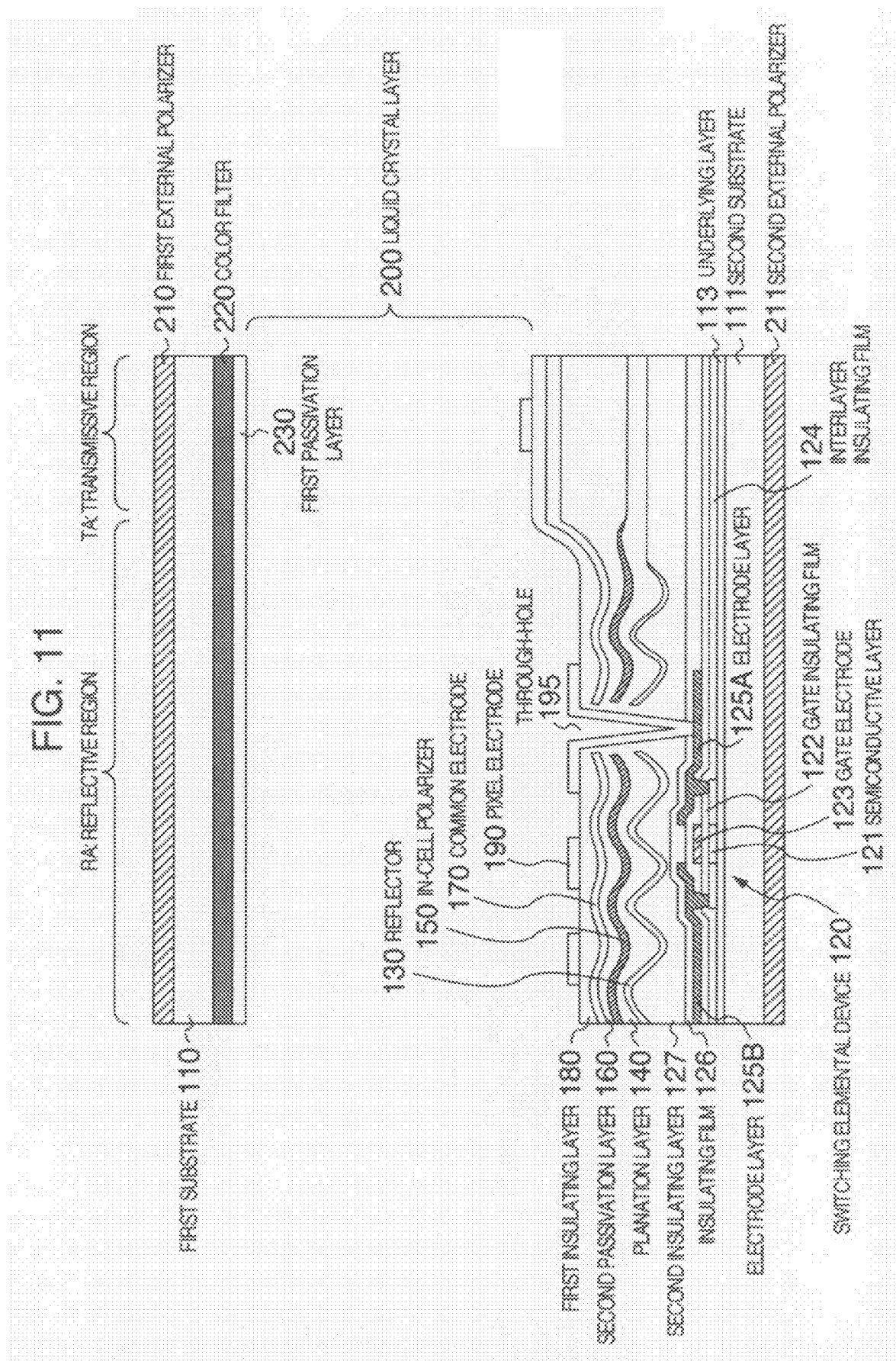
FIG. 11 is a schematic cross-sectional view showing a construction of a subpixel in a liquid crystal display panel according to the third embodiment of this invention.

FIG. 11 shows a cross-sectional view of another construction of this embodiment. The liquid crystal display device of this construction differentiates between the transmissive region and the reflective region the thickness of the second passivation layer 160 formed between the in-cell polarizer 150 and the common electrode 170, in order to differentiate the thickness of the liquid crystal layer between the transmissive region TA and the reflective region RA. In other respects, this construction is similar to that of the liquid crystal display device of embodiment 1. In this construction, the passivation layer applied to the entire surface is removed more from the reflective region by the photolithography to make the second passivation layer 160 in the transmissive region thicker than that in the reflective region.

Figure 12:
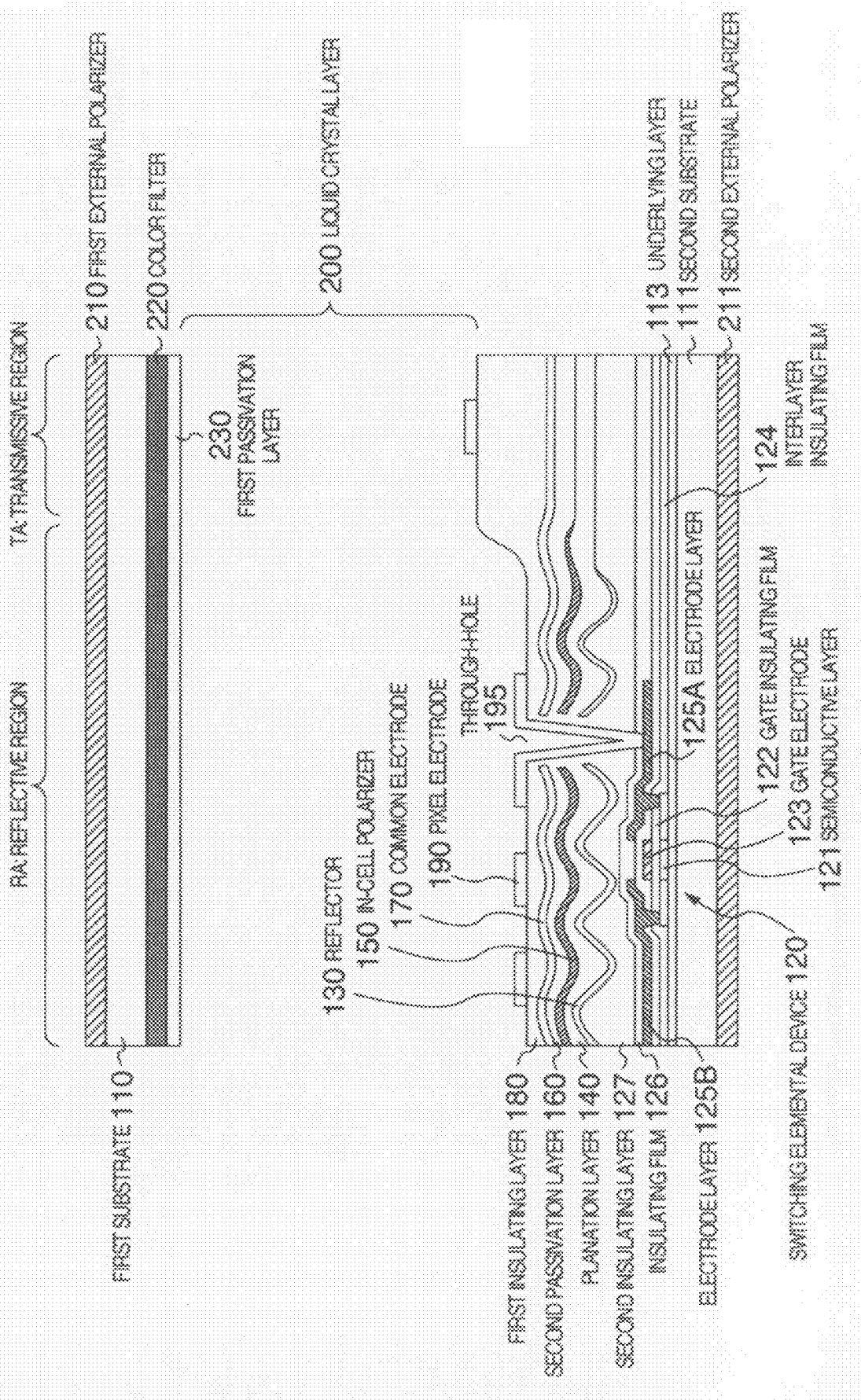
FIG. 12 is a schematic cross-sectional view showing a construction of a subpixel in a liquid crystal display panel according to the third embodiment of this invention.

FIG. 12 is a cross-sectional view showing still another construction of this embodiment. The liquid crystal display device of this construction forms a step in the first insulating layer 180 disposed over the common electrode 170 at a boundary between the transmissive region TA and the reflective region RA. In other respects, this construction is similar to that of the liquid crystal display device of embodiment 1. In this construction, the insulating layer applied to the entire surface is removed more from the reflective region RA by the photolithography to make the first insulating layer 180 in the transmissive region TA thicker than that in the reflective region RA.

Figure 13:
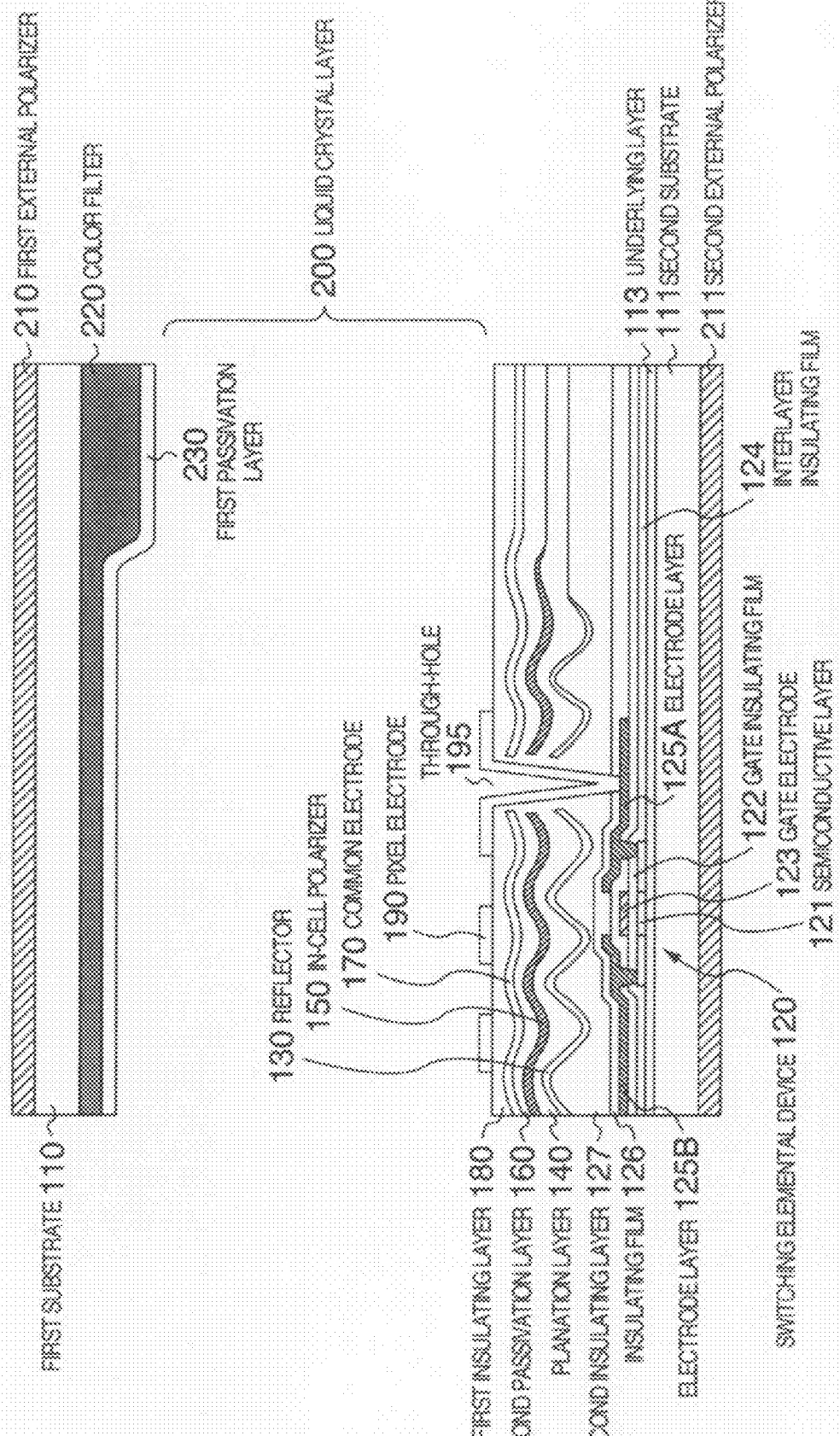
FIG. 13 is a schematic cross-sectional view showing a construction of a subpixel in a liquid crystal display panel according to the third embodiment of this invention.

FIG. 13 is a cross-sectional view showing still another construction of this embodiment. The liquid crystal display device of this construction forms a step in the color filter 220 disposed over the first substrate 110 at a boundary between the transmissive region and the reflective region to differentiate the thicknesses of the reflective region RA and the transmissive region TA. In other respects, this construction is similar to that of the liquid crystal display device of embodiment 1. In this construction, a colorant film is applied to the first substrate and subjected to pattern exposure and development to form a color filter 220 composed of three colors in the reflective region RA and a color filter 220 composed of three colors in the transmissive region TA. Here the photolithography may be used to make the thickness of the color filter 220 in the reflective region RA smaller than that of the color filter 220 in the transmissive region TA. It is also possible to execute the steps of colorant film application, pattern exposure and development six times. A halftone exposure technique may be used to form the color filter 220. In this case the steps of colorant film application, pattern exposure and development need to be executed only three times, reducing the number of fabrication steps. In this construction, since the color filter 220 in the reflective region RA is made thinner, an advantageous effect of an increased brightness in the reflective region can be produced.

Figure 14:
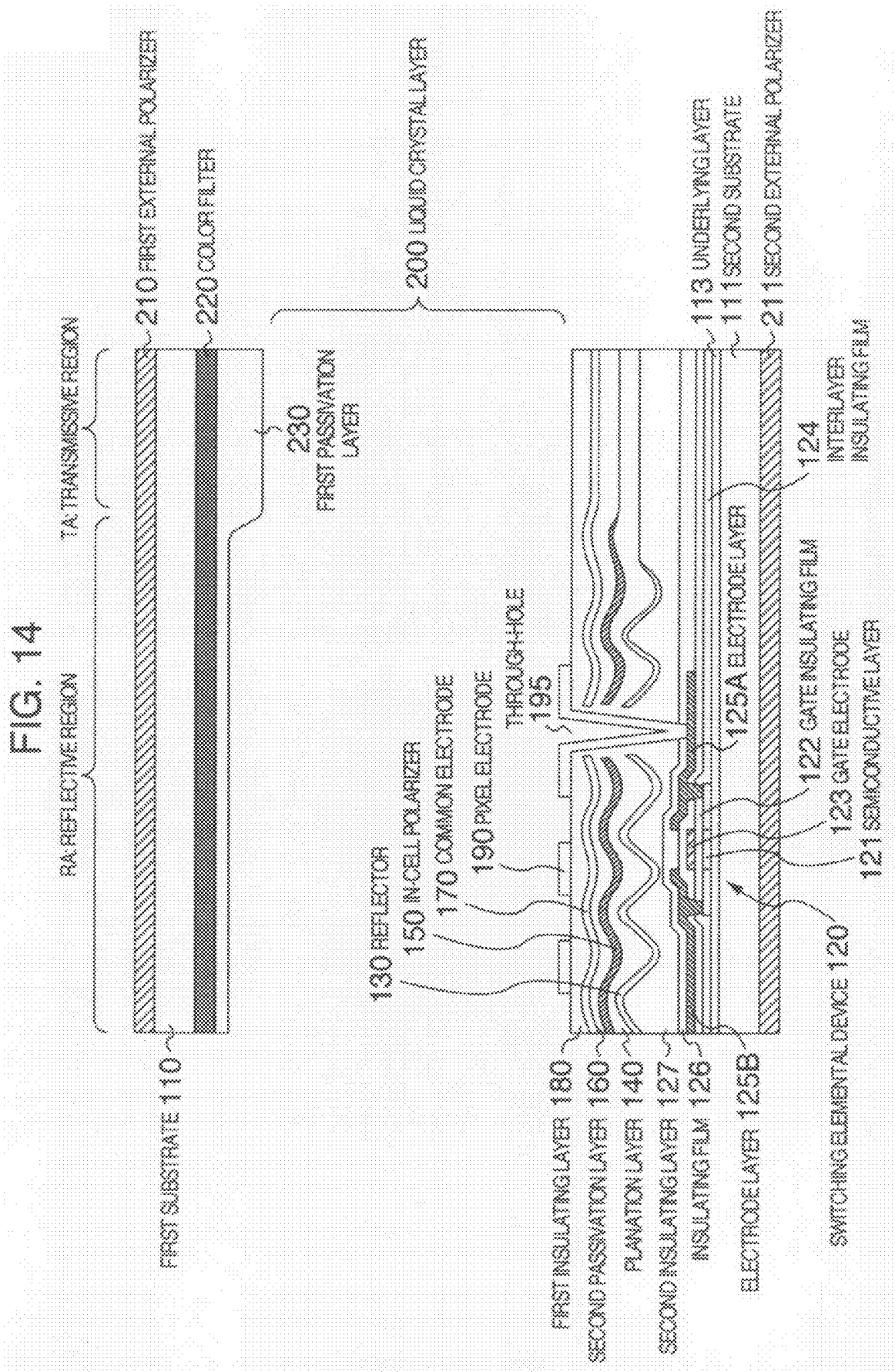
FIG. 14 is a schematic cross-sectional view showing a construction of a subpixel in a liquid crystal display panel according to the third embodiment of this invention.

FIG. 14 is a cross-sectional view showing still another construction of this embodiment. The liquid crystal display device of this construction differentiates the thickness of the first passivation layer 230 disposed over the color filter 220 between the transmissive region TA and the reflective region RA, to differentiate the thickness of the liquid crystal layer between the transmissive region TA and the reflective region RA. In other respects, this construction is similar to that of the liquid crystal display device of embodiment 1. In this construction, when the first passivation layer 230 is formed over the color filter 220, the passivation layer applied to the entire surface is removed more from the reflective region RA by the photolithography or other techniques to make the thickness of the first passivation layer 230 in the transmissive region TA greater than that of the reflective region RA.

Figure 15:
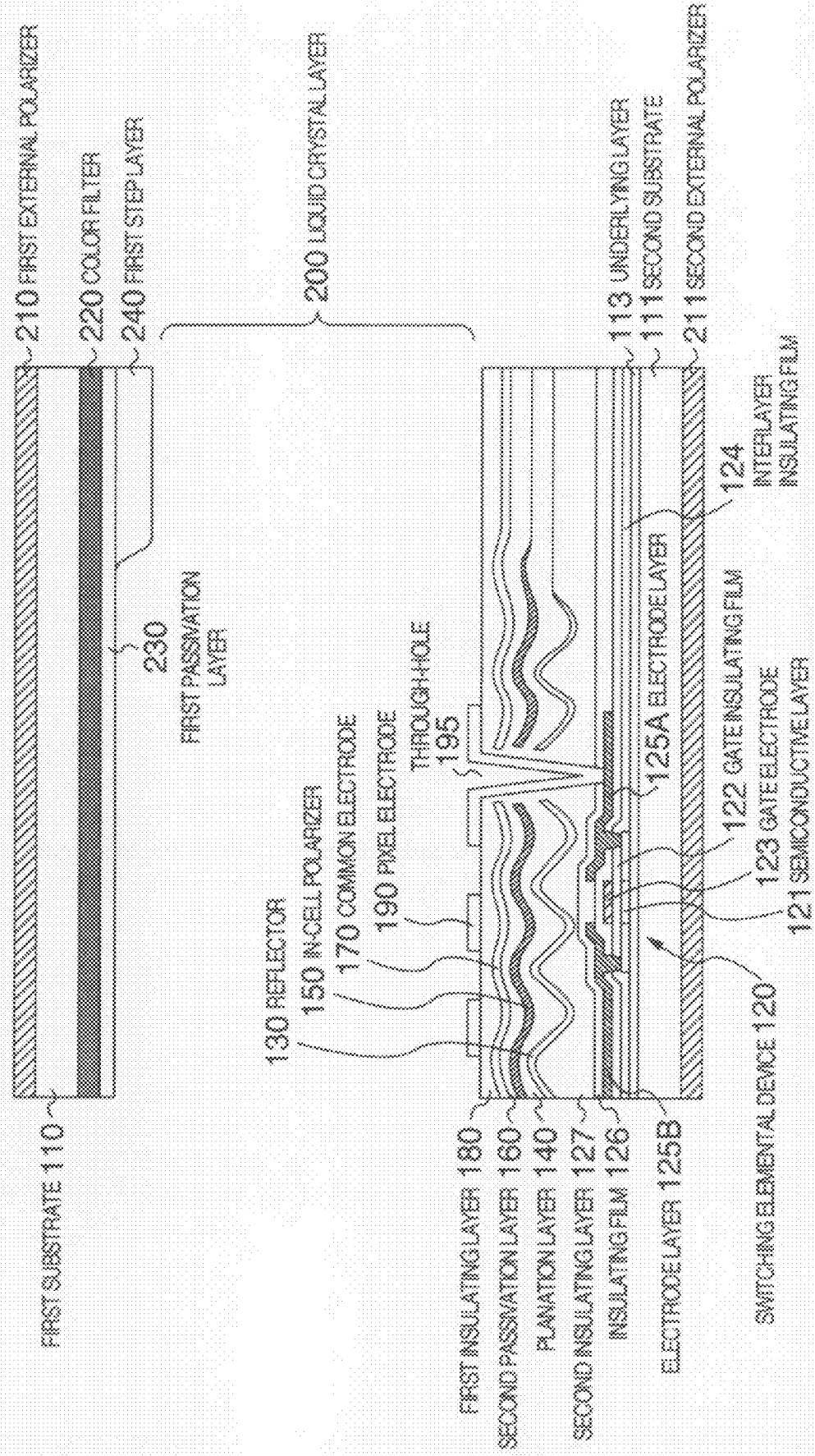
FIG. 15 is a schematic cross-sectional view showing a construction of a subpixel in a liquid crystal display panel according to the third embodiment of this invention.

FIG. 15 is a cross-sectional view showing still another construction of this embodiment. The liquid crystal display device of this construction forms a first step layer 240 between the first passivation layer 230 and the liquid crystal layer 200 to differentiate the thickness of the liquid crystal layer between the transmissive region TA and the reflective region RA. In other respects, this construction is similar to that of the liquid crystal display device of embodiment 1. While in the construction of FIG. 15 the first step layer 240 is formed over the first passivation layer 230, it may be formed over the color filter 220. In this construction, the material for the step layer applied to the entire surface is removed from the reflective region as by the photolithography to form the step layer only in the transmissive region.

Figure 16:
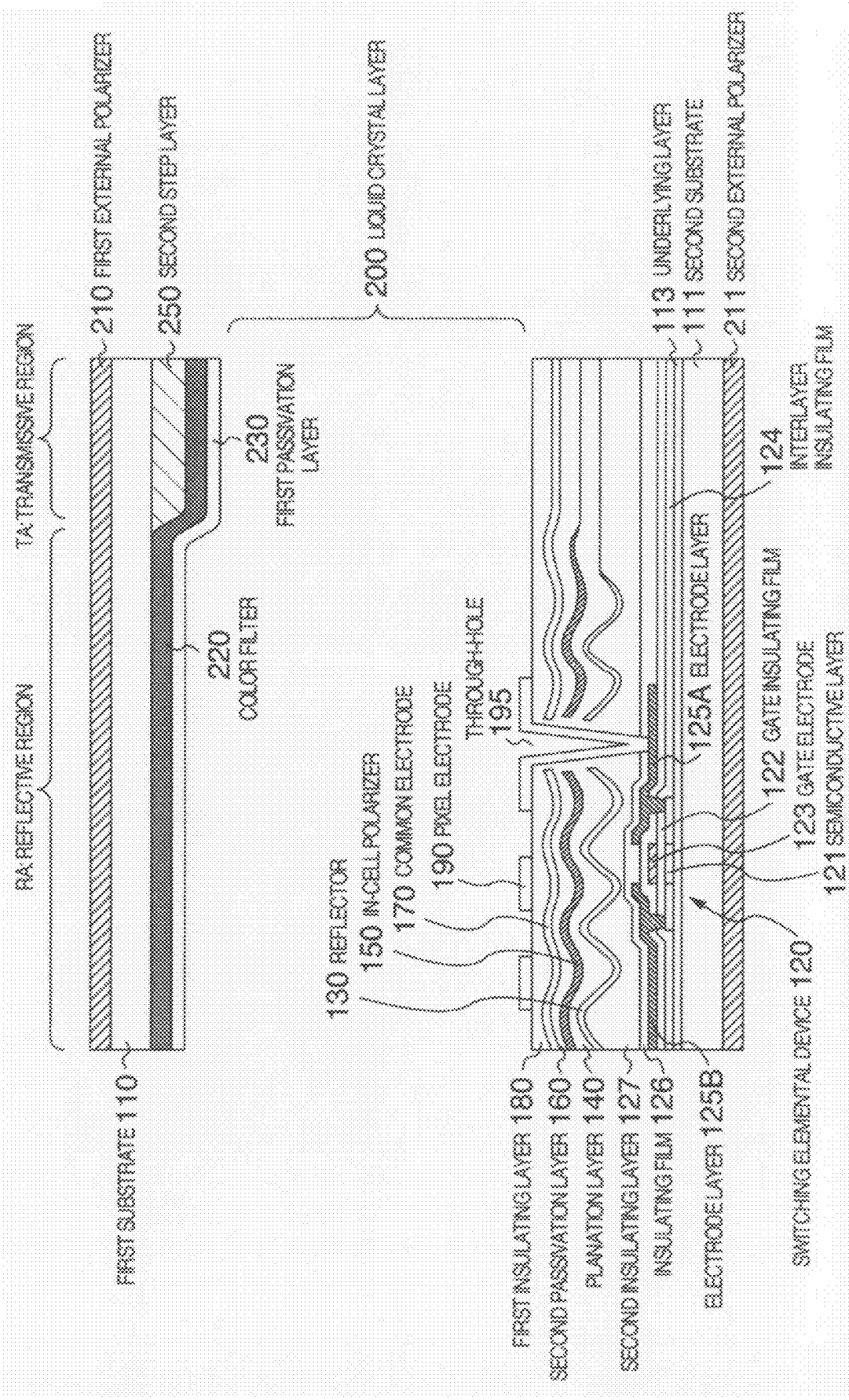
FIG. 16 is a schematic cross-sectional view showing a construction of a subpixel in a liquid crystal display panel according to the third embodiment of this invention.

FIG. 16 is a cross-sectional view showing still another construction of this embodiment. The liquid crystal display device of this construction forms a second step layer 250 between the first substrate 110 and the color filter 220 to differentiate the thickness of the liquid crystal layer between the transmissive region TA and the reflective region RA. In other respects, this construction is similar to that of the liquid crystal display device of embodiment 1. In this construction, the material for the step layer applied to the entire surface is removed from the reflective region as by the photolithography or other techniques to form the second step layer 250 only in the transmissive region.

Fourth Embodiment

Next, a fourth embodiment of the liquid crystal display device according to the present invention will be explained by referring to FIG. 17 to FIG. 21.

Figure 17:
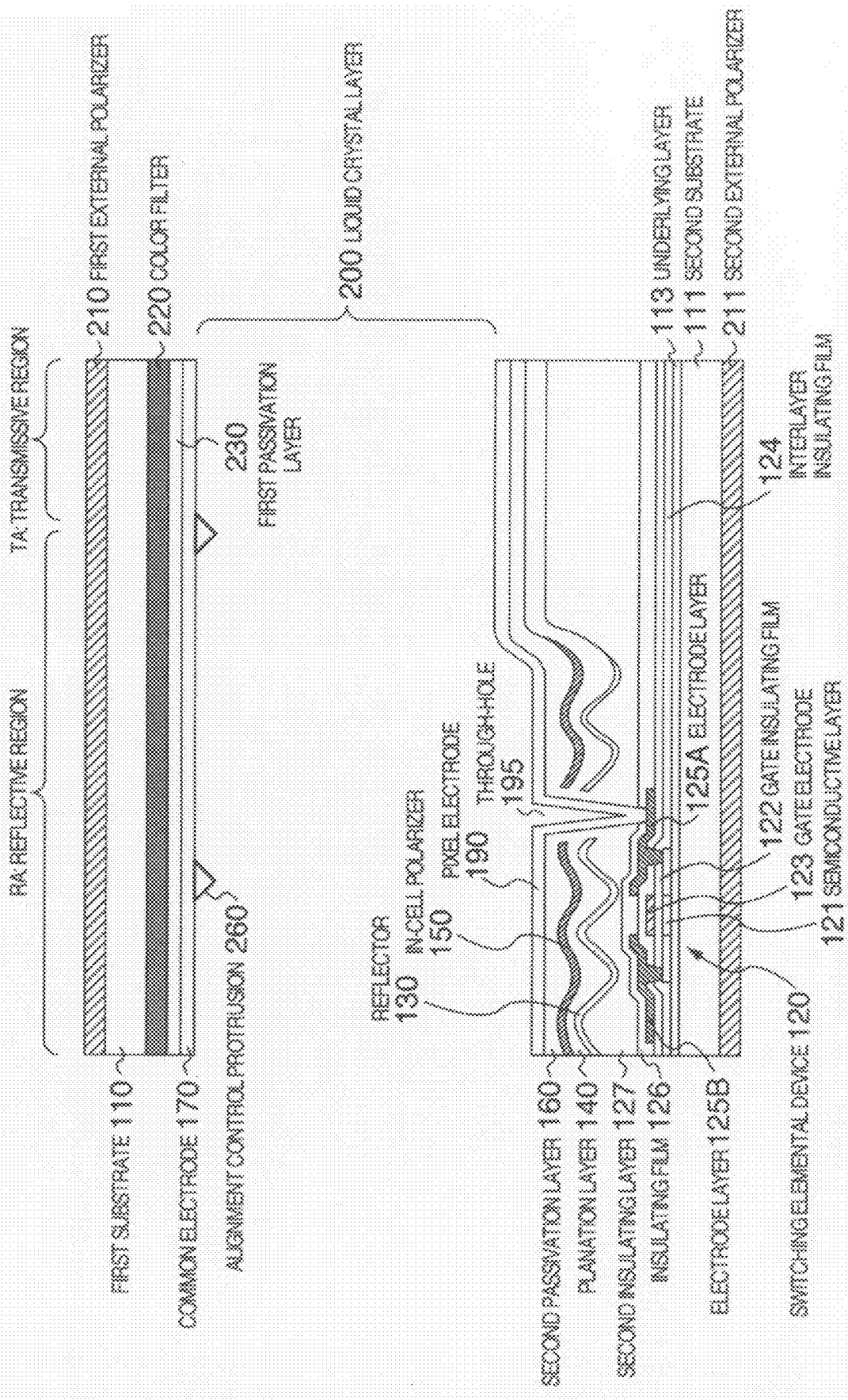
FIG. 17 is a schematic cross-sectional view showing a construction of a subpixel in a liquid crystal display panel according to a fourth embodiment of this invention.
Figure 18:
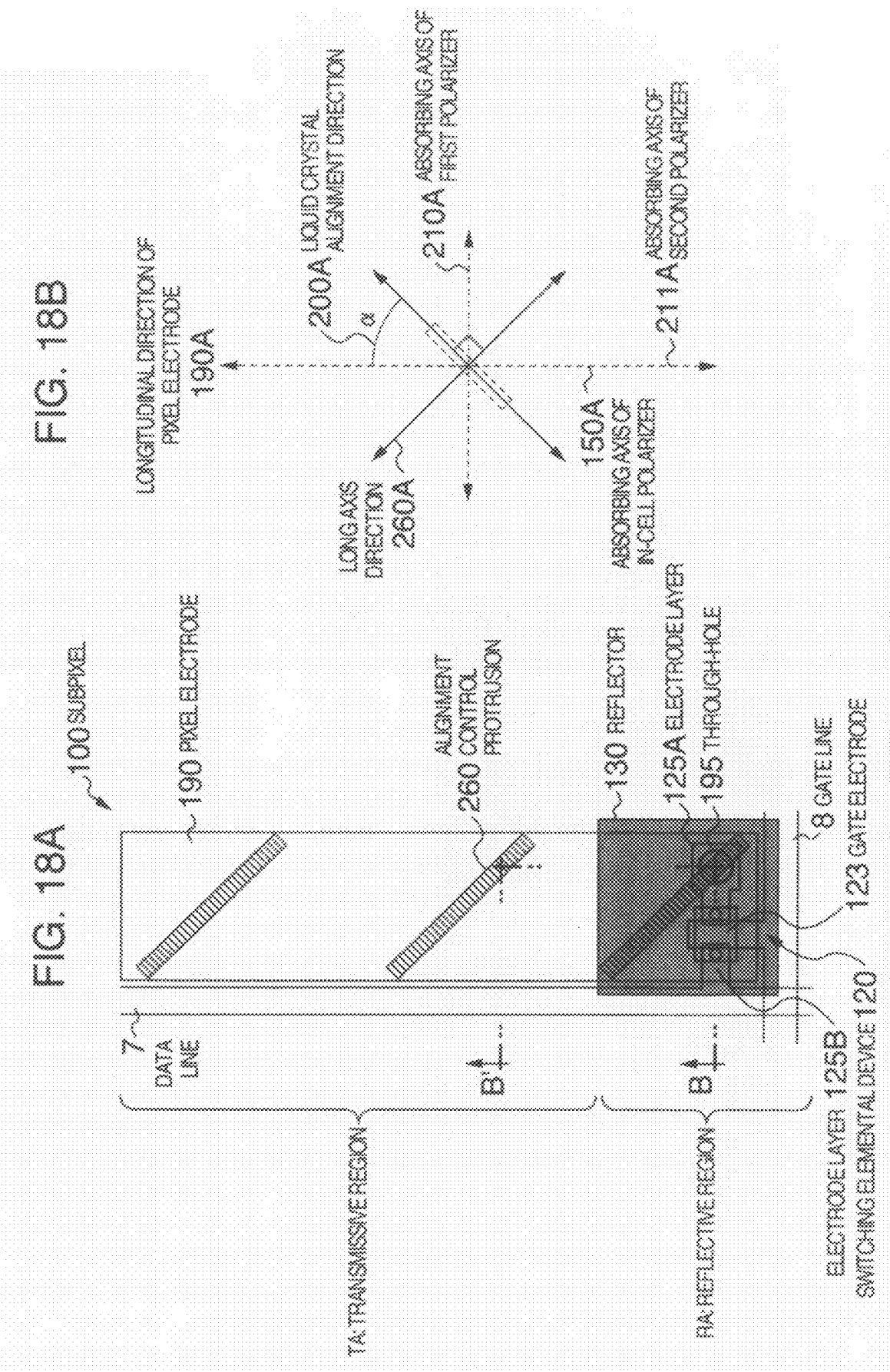
FIG. 18A is a schematic plan view showing a construction of a subpixel in a liquid crystal display panel according to the fourth embodiment of this invention.
FIG. 18B is a schematic diagram showing axial directions in the subpixel in the liquid crystal display panel according to the fourth embodiment of this invention.

FIG. 17 is a schematic cross-sectional view showing a construction of a main part of a subpixel 100 in a liquid crystal display panel forming the liquid crystal display device of this embodiment. The liquid crystal display device of this embodiment has the liquid crystals initially aligned perpendicular to the substrate surface and employs a vertical alignment (VA) system in which an electric field perpendicular to the substrate surface is applied between the pixel electrode and the common electrode to drive the liquid crystal layer. FIG. 18A is a plan view showing an outline construction of a main part of the subpixel 100 in the liquid crystal display panel forming the liquid crystal display device of this invention. FIG. 17 schematically shows the cross section taken along the line B-B' of FIG. 18A and explanations of the parts are omitted because they are identical with those of embodiment 1.

The liquid crystal display panel of the liquid crystal display device of this invention, as shown in FIG. 17, comprises a first substrate 110, a second substrate 111, a liquid crystal layer 200 disposed between the first substrate 110 and the second substrate 111, a first external polarizer 210 disposed over the first substrate 110 on a side opposite the liquid crystal layer 200, and a second external polarizer 211 disposed over the second substrate 111 on a side opposite the liquid crystal layer 200.

In the transmissive region TA, the first substrate 110 has a color filter 220, a first passivation layer 230, a common electrode 170 and an alignment control protrusion 260 on the liquid crystal layer 200 side. The second substrate 111 has a second insulating layer 127, a planation layer 140, a second passivation layer 160 and a pixel electrode 190, all being laminated thereon in that order on the liquid crystal layer 200 side.

In the reflective region RA, the first substrate 110, as in the transmissive region, has a color filter 220, a first passivation layer 230, a common electrode 170 and an alignment control protrusion 260 on the liquid crystal layer 200 side. The second substrate 111 has a second insulating layer 127, a reflector 130, a planation layer 140, an in-cell polarizer 150, a second passivation layer 160 and a pixel electrode 190, all being laminated thereon in that order on the liquid crystal layer 200 side.

An alignment layer (not shown) is laminated over the color filter 220 on the liquid crystal layer 200 side. The alignment layer is made of, for example, polyimide-based polymer or diamond-like carbon. The alignment layer is formed so as to align the liquid crystals perpendicular to the substrate Further, the pixel electrode 190 connects to an electrode layer 125A forming a switching elemental device 120 via a through-hole 195 that penetrates the second passivation layer 160, in-cell polarizer 150, planation layer 140, reflector 130, second insulating layer 127 and second interlayer insulating film 126. The through-hole 195 may be directly covered with the same conductive material as the pixel electrode 190, or an intermediate layer not shown may be provided for improved contact between the electrode material of the pixel electrode 190 and the electrode layer 125A.

The pixel electrode 190, as shown in FIG. 18A, is formed as a solid electrode separated for each pixel.

The alignment control protrusion 260 is formed on the liquid crystal layer 200 side of the common electrode 170.

To differentiate the thickness of the liquid crystal layer 200 between the transmissive region TA and the reflective region RA, the following construction is adopted.

In this embodiment, by differentiating between the transmissive region TA and the reflective region RA the thickness of the second insulating layer 127 formed below the reflector 130 of the second substrate 111, the thicknesses of the liquid crystal layers 200 in the transmissive region TA and the reflective region RA are differentiated. The surface of the second insulating layer 127 provides a base on which to form an undulating surface of the reflector 130 in the reflective region RA. The undulations are realized by the photolithography. In the process of forming undulations by the second insulating layer 127, a step can be formed between the second insulating layers 127 of the reflective region RA and the transmissive region TA by forming the insulating layer 1-2 μm thicker than the normal condition and exposing the second insulating layer 127 so that the second insulating layer 127 in the transmissive region TA will remain in the as-applied shape.

The in-cell polarizer 150 is arranged only in the reflective region RA of the second substrate 111. The in-cell polarizer 150 is formed over the reflector 130. If necessary, the planation layer 140 may be formed between the reflector 130 and the in-cell polarizer 150. In that case, since the undulations of the in-cell polarizer 150 are reduced by the planation layer 140, degradations in the polarization characteristic of the in-cell polarizer 150 can be minimized.

If the second passivation layer 160 over the in-cell polarizer 150 and the planation layer 140 over the reflector 130 are applied not only to the reflective region RA but also to the transmissive region TA, a step between the transmissive region TA and the reflective region RA needs to be set greater than the difference in the thickness of the liquid crystal layer 200 between the transmissive region TA and the reflective region RA because the second passivation layer 160 and the planation layer 140 have an effect of reducing a difference in the height of the second insulating layer 127 between the transmissive region TA and the reflective region RA.

Over the pixel electrodes 190, an alignment layer (not shown) that covers them and others is formed. The alignment layer, as with the alignment layer formed on the first substrate 110, is formed so that the initial alignment direction of the liquid crystal molecules is vertical to the first substrate 110.

The first substrate 110 and the second substrate 111 are arranged so that their alignment layer formation surfaces oppose each other. The two substrates are bonded together along their circumference by a framelike sealing material with spacers (not shown) installed between them to form a space inside. This space is filled with a nematic liquid crystal with a negative dielectric anisotropy, which is then sealed, thus providing the liquid crystal layer 200. The liquid crystal layer 200 has the alignment direction of long axes of liquid crystal molecules defined by the aligning treatment applied to the alignment layers formed on the first substrate 110 and the second substrate 111. The initial liquid crystal alignment direction of the liquid crystal layer 200 is vertical to the two substrates 110, 111.

FIG. 18B shows one example relation among a linear polarization absorption axis 210A of the first external polarizer 210, a linear polarization absorption axis 211A of the second external polarizer 211, an alignment direction 200A of liquid crystal molecules' long axes in the liquid crystal layer 200 after being applied with a drive voltage, a linear polarization absorption axis 150A of the in-cell polarizer 150, and a long axis direction 260A of the alignment control protrusion 260.

In this invention, the absorption axis 210A of the first external polarizer 210 is set in the longitudinal direction 190A of the pixel electrode and the absorption axis 211A of the second external polarizer 211 is set perpendicular to the absorption axis 210A of the first external polarizer 210. Further, in the transflective liquid crystal display device of this invention, the absorption axis 150A of the in-cell polarizer is set parallel to the absorption axis 211A of the second external polarizer.

The alignment direction (liquid crystal alignment direction) 200A of liquid crystal molecules' long axes after being applied with a drive voltage is tilted by an angle of α with respect to the absorption axis 211A of the second external polarizer 211. When this angle α is around ±45 degrees, application of a voltage to the liquid crystal results in a white mode display.

Since the alignment direction 200A of liquid crystal molecules when applied with a drive voltage is set perpendicular to the long axis direction 260A of the alignment control protrusion 260, the alignment control protrusion 260 is preferably set perpendicular to the liquid crystal alignment direction 200A.

Next, the operation of the liquid crystal display device of this invention will be explained.

In the transmissive region TA the operation is as follows.

Of the rays of light emitted from the backlight and thrown onto the liquid crystal display panel, those incident on the transmissive region TA passes through the second external polarizer 211 and the liquid crystal layer 200 and enters the first external polarizer 210. In this case, if the drive voltage is 0 V, i.e., if there is no potential difference between the pixel electrode and the common electrode and no electric field produced, the alignment direction of liquid crystal molecules remains unchanged. That is, the retardation Δnd is almost 0, so the polarized state of light is maintained as it passes through the liquid crystal layer 200. Thus, the light that has passed through the liquid crystal layer 200 is absorbed by the first external polarizer 210, resulting in a black (dark) mode display.

When a predetermined drive voltage is applied to the pixel electrode to produce a predetermined electric field between the pixel electrode and the common electrode, the liquid crystal alignment direction changes from the perpendicular direction to the parallel direction with respect to the polarizer. As a result, the light that has passed through the second external polarizer 211 changes its polarized state as it passes through the liquid crystal layer 200. Thus, the amount of light that passes through the first external polarizer 210 corresponds to a change in the polarized state of the liquid crystal layer 200, producing a desired brightness. Thus, when the drive voltage is zero, a black (dark) mode is displayed, while when a predetermined drive voltage is applied, a light mode is displayed. This operation is a so-called normally black display mode.

In the reflective region RA the operation is as follows.

Ambient light that enters into the reflective region RA of the liquid crystal display panel from the front side passes through the first external polarizer 210 and then the liquid crystal layer 200 before entering into the in-cell polarizer 150.

In this case, if the drive voltage is 0 V, i.e., if there is no potential difference between the pixel electrode and the common electrode and so no electric field is formed, the alignment direction of the liquid crystal molecules remains unchanged. That is, the retardation Δnd is 0, so the polarized state of the light is maintained as it passes through the liquid crystal layer 200. Therefore, most of the light that has passed through the liquid crystal layer 200 is absorbed by the in-cell polarizer 150 and is not reflected outside, resulting in a black (dark) mode display.

When a predetermined drive voltage is applied to the pixel electrode to form a predetermined electric field between the pixel electrode and the common electrode, the liquid crystal alignment direction changes from the perpendicular direction to the parallel direction with respect to the polarizer. As a result, the light changes its polarized state as it passes through the liquid crystal layer 200. Thus, the amount of light that passes through the in-cell polarizer 150 and reaches the reflector 130 corresponds to a change in the polarized state of the liquid crystal layer 200, producing a desired brightness. The light incident on the reflector 130 is reflected by it and re-enters the in-cell polarizer 150. The polarized state of the light that has been reflected by the reflector 130 and has passed through the in-cell polarizer 150 is mostly maintained. So, most of light that re-enters into the in-cell polarizer 150 passes through it and then the liquid crystal layer 200 before entering the first external polarizer 210. In this case, the polarized state of light similarly changes as it passes through the liquid crystal layer 200. The amount of light that passes through the first external polarizer 210 corresponds to a change in the polarized state of the liquid crystal layer 200. Thus, a desired brightness is produced. That is, when the drive voltage is zero, a black (dark) mode is displayed, while and when a predetermined drive voltage is applied, a light mode is displayed. This operation is a so-called normally black reflective display mode.

As described above, a normally black type transflective liquid crystal display device can be obtained in which both of the transmissive region TA and the reflective region RA change to the black mode when the drive voltage is turned off while the both go to the white mode when the voltage is turned on.

Figure 19:
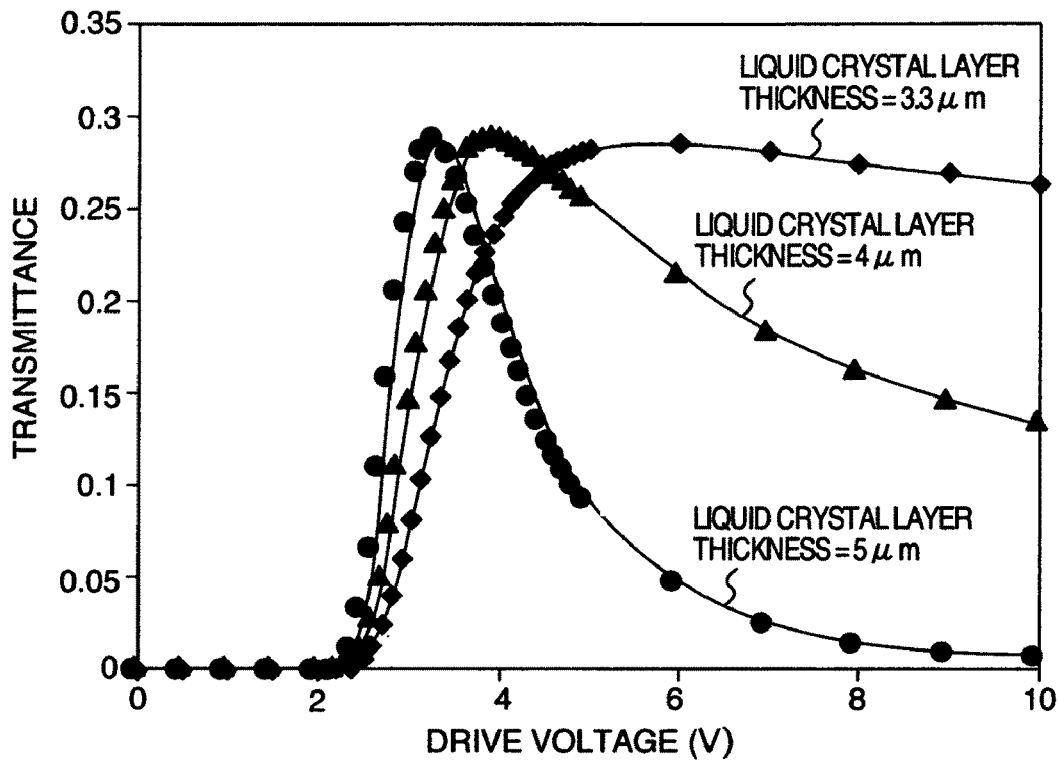
FIG. 19 is a graph showing an example drive voltage dependence of reflectance when the liquid crystal layer thickness is set at 3.3 μm, 4 μm and 5 μm in the reflective region of the liquid crystal display device according to the fourth embodiment of this invention.

FIG. 19 shows a drive voltage dependence of the reflectance of the transflective liquid crystal display device of this invention. This graph is a result of simulation assuming that a coating type material is used as the in-cell polarizer.

The graph shows characteristics for different thicknesses of the liquid crystal layer of 3.3 μm, 4 μm and 5 μm, with the horizontal axis representing a drive voltage (V) and the vertical axis representing a reflectance. FIG. 19 shows that as the thickness of the liquid crystal layer increases, the drive voltage for the maximum reflectance decreases. It is also seen from the drawing that the maximum reflectance rises, though by a small quantity, as the thickness of the liquid crystal layer increases. That is, an increase in the thickness of the liquid crystal layer results in a reduction in the drive voltage and an increase for the maximum reflectance.

Here, a relation between a retardation Δnd of the liquid crystals and a transmittance and a reflectance will be discussed.

Figure 20:
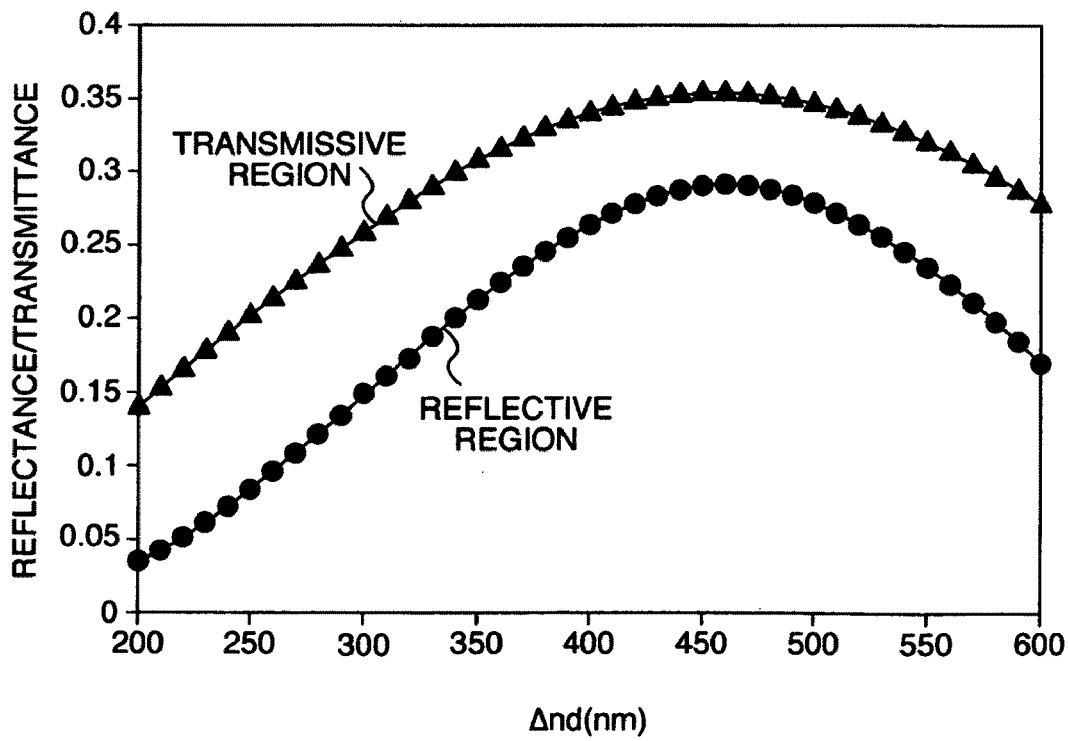
FIG. 20 is a graph showing an example relation between retardation Δnd and reflectance/transmittance in the reflective region and transmissive region in the liquid crystal display device according to the fourth embodiment of this invention when a drive voltage of 3.5 V is applied to the liquid crystal layer.

FIG. 20 shows an example relation among the retardation Δnd, the reflectance, and the transmittance in the transflective liquid crystal display device of this invention. The reflectance and the transmittance shown in FIG. 20 are those obtained when a drive voltage of 3.5 V is applied to the liquid crystal layer. Since in FIG. 20 the refractive index anisotropy Δn is set at 0.1, a change in retardation is equivalent to a change in the thickness d of the liquid crystal layer. It is seen from FIG. 20 that the value of retardation Δnd that makes the reflectance and the transmittance maximum is 460 nm, i.e., the transmittance and the reflectance are maximum when the thickness d of the liquid crystal layer is 4.6 μm. That is, there is a thickness of the liquid crystal layer dmax that renders the display brightness maximum.

In the case of the VA (vertical alignment) display in which the transmissive region, in particular, attaches weight to picture quality, a priority is given to the viewing angle characteristic, so it is common practice to operate the white mode with a lower voltage than the drive voltage corresponding to the maximum transmittance. In this invention, therefore, a priority is given to the viewing angle characteristic and for the transmissive region a white mode display is operated with a voltage lower than the drive voltage corresponding to the maximum transmittance. In the reflective region, on the other hand, what is required is to give a priority to brightness and to select a thickness of the liquid crystal layer that attains the maximum reflectance with the same drive voltage as that used in the transmissive region. That is, in the reflective region, the thickness of the liquid crystal layer is set greater than that of the transmissive region to ensure that the maximum reflectance can be obtained with a lower drive voltage than in the transmissive region.

It is known that the thickness of the liquid crystal layer influences its response time and that, as the thickness of the liquid crystal layer is reduced, the response time of the liquid crystal decreases. To reduce stresses the user feels when he or she views a moving picture, the liquid crystal layer should preferably be reduced in thickness to shorten the response time of the liquid crystal.

When the transmissive region and the reflective region are compared, the transmissive region is generally required to produce a higher quality image with better color purity and higher contrast. Accordingly, in displaying moving pictures, it is also desired that the transmissive region have a fast response.

To establish both the high speed response in the transmissive region and the bright display in the reflective region, this invention therefore makes the liquid crystal layer 200 in the reflective region RA thicker than in the transmissive region TA. That is, the liquid crystal layer thicknesses in the transmissive and reflective regions are determined to satisfy the condition of dr>dt, where dt is the thickness of liquid crystal layer in the transmissive region TA and dr is the thickness of liquid crystal layer in the reflective region RA. Here, it is desired that the thickness of liquid crystal layer in the reflective region RA is set equal to the thickness of liquid crystal layer dmax that gives the maximum brightness with a predetermined drive voltage, in order to establish both the high speed response of the liquid crystal in the transmissive region and the bright display in the reflective region. Therefore, the liquid crystal display device of this invention should preferably be configured to satisfy the conditions of dr>dt and dr=dmax.

Figure 21A:
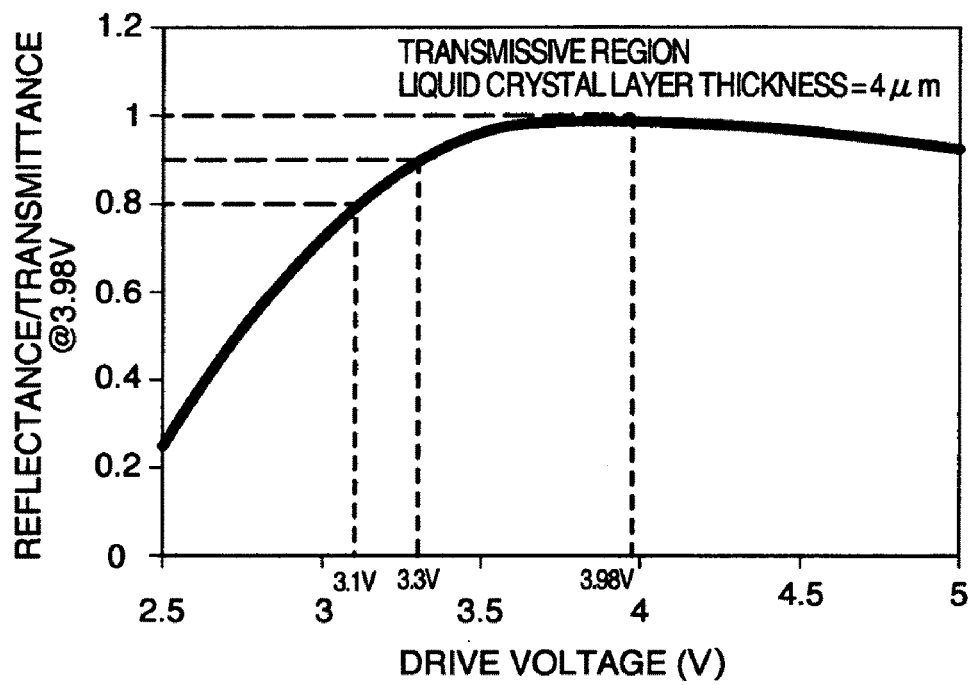
FIG. 21A is a graph showing a drive voltage dependence of transmittance in the transmissive region in the liquid crystal display device according to the fourth embodiment of this invention.

Let us consider an example case in which the thickness of the liquid crystal layer 200 in the transmissive region TA is set at 4 μm. FIG. 21A shows a drive voltage dependence of the transmittance in the transmissive region. Here, the transmittance in this graph is a relative transmittance normalized by the maximum transmittance.

Figure 21B:
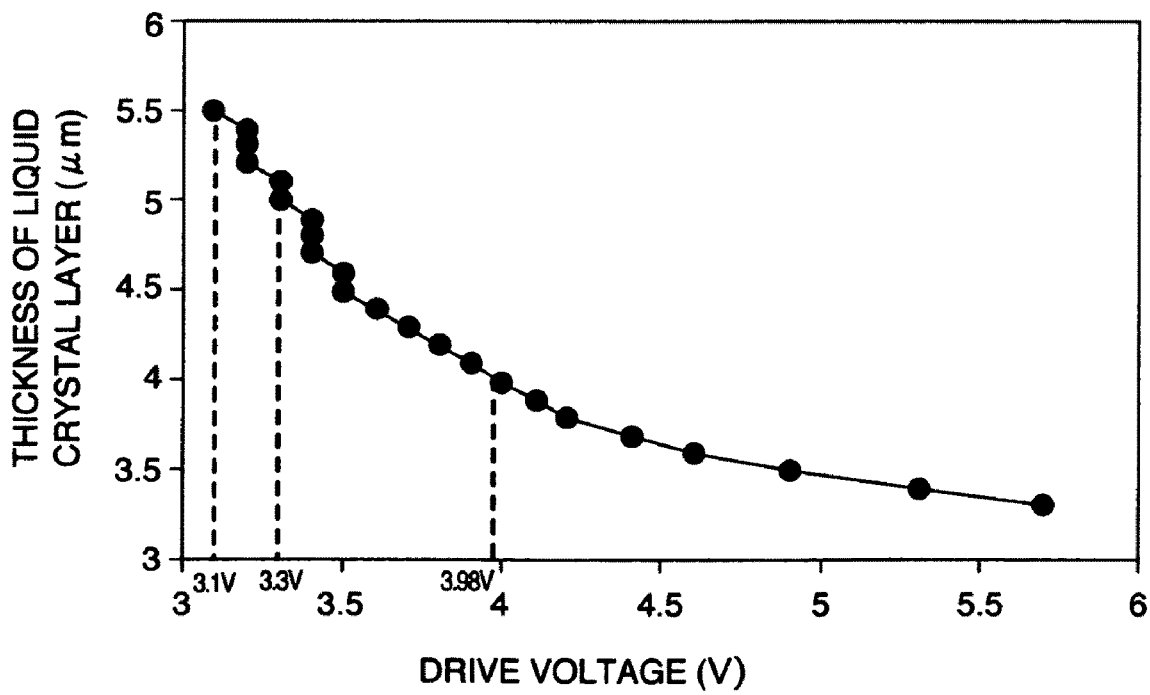
FIG. 21B is a graph showing a relation between a liquid crystal layer thickness in the reflective region and a drive voltage that gives a maximum reflectance in the liquid crystal display device according to the fourth embodiment of this invention.

Considering the viewing angle dependence of the transmissive region, the white mode should preferably be activated with a drive voltage ranging from a voltage that produces the maximum transmittance to a voltage that produces 80% of the maximum transmittance. It is therefore desired from FIG. 21A that the drive voltage for white mode is set in a range of between 3.1 V and 3.98 V. Next, how the thickness of the liquid crystal layer in the reflective region RA should be set is discussed. From the relation between the drive voltage and the transmittance in the transmissive region, the thickness of the liquid crystal layer in the reflective region needs to be selected so that the drive voltage for the maximum reflectance is in the range of between 3.1 V and 3.98 V. FIG. 21B shows a relation between the thickness of the liquid crystal layer in the reflective region and the drive voltage for the maximum reflectance. From FIG. 21B it is seen that, to realize a brighter display in the reflective region RA than when the reflective region RA has the same thickness of the liquid crystal layer as the transmissive region, the thickness of the liquid crystal layer needs to be set in a range of 4-5.5 μm. From the relation between the liquid crystal layer thickness and the transmittance in FIG. 20, the liquid crystal layer thickness in the transmissive region that can attain high transmittance is considered to be in a range of about 3.5-5 μm.

When the liquid crystal layer thickness in the transmissive region is set at 3.5 μm, 4.5 μm and 5 μm, the liquid crystal layer thickness in the reflective region should desirably be designed within ranges of 3.5-5.1 μm, 4.5-6.4 μm and 5-7.1 μm, respectively.

To describe this relationship in terms of liquid crystal layer thickness, a condition of dt<dr<1.4 dt should preferably be satisfied in order to establish good viewing angle characteristic and high-speed response of liquid crystal in the transmissive region and bright view in the reflective region.

If the liquid crystal layer thickness in the transmissive region is set large, considering a high display brightness, the white mode is activated with a drive voltage ranging from a voltage that gives the maximum transmittance to a voltage that gives 90% of the maximum transmittance. It is required only that the liquid crystal layer thickness is selected so that the maximum reflectance can be obtained with that drive voltage. It is also desired that the relation between the liquid crystal layer thicknesses meet the condition of dt<dr<1.26 dt.

As described above, this invention sets the thickness of the liquid crystal layer in the reflective region greater than that of the transmissive region to realize a transflective liquid crystal display device that has an improved reflectance and a high reflection contrast in the reflective region and also a fast response of the liquid crystal layer in the transmissive region.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display device comprising:
a backlight;
a first substrate;
a second substrate;
a liquid crystal layer disposed between said first substrate and said second substrate;
a pixel electrode and a common electrode, disposed at least one of said first and second substrates to drive the liquid crystal layer;
a first polarizer provided on said first substrate on a side opposite to the liquid crystal layer; and
a second polarizer provided on said second substrate on a side opposite to the liquid crystal layer;
wherein a plurality of pixels are formed between said first and second substrates and each pixel is provided with a reflective region and a transmissive region;
wherein a step layer to differentiate the thickness of said liquid crystal layer between said transmissive region and said reflective region is disposed on said first substrate;
wherein said second substrate is closer to said backlight than said first substrate;
wherein, in said reflective region of said second substrate, a reflector and an in-cell polarizer are formed;
wherein the thickness of said liquid crystal layer is greater in the reflective region than in said transmissive region;
wherein said in-cell polarizer is only formed in said reflective region of said second substrate.

2. A liquid crystal display device according to claim 1, wherein an absorption axis of said in-cell polarizer is parallel to an absorption axis of said second polarizer.

3. A liquid crystal display device according to claim 1, wherein said pixel electrode and said common electrode are disposed on the second substrate;
wherein an electric field is applied between said pixel electrode and said common electrode to drive the liquid crystal layer.

4. A liquid crystal display device according to claim 3, wherein said liquid crystal layer satisfies dr>dt and dr=dmax where dt is a thickness of said liquid crystal layer in said transmissive region, dr is a thickness of said liquid crystal layer in said reflective region, and dmax is a thickness of said liquid crystal layer that gives a maximum display brightness.

5. A liquid crystal display device according to claim 4, wherein said liquid crystal layer satisfies 1.6 dt>dr>dt.

6. A liquid crystal display device according to claim 1, wherein a color filter is disposed on said first substrate and said color filter serves also as said step layer.

7. A liquid crystal display device according to claim 1, wherein a color filter is disposed on said first substrate;
wherein said step layer is a passivation layer disposed between said color filter and said liquid crystal layer.

8. A liquid crystal display device according to claim 1,
wherein said common electrode is disposed on said first substrate;
wherein said pixel electrode is disposed on said second substrate;
wherein said liquid crystal layer has a negative dielectric constant;

wherein an electric field is applied between said pixel electrode and said common electrode to drive said liquid crystal layer.

9. A liquid crystal display device according to claim 8, wherein the liquid crystal layer satisfies dr>dt and dr=dmax where dt is a thickness of said liquid crystal layer in said transmissive region, dr is a thickness of said liquid crystal layer in the reflective region, and dmax is a thickness of said liquid crystal layer that gives a maximum display brightness.

10. A liquid crystal display device according to claim 9, wherein said liquid crystal layer satisfies dt<dr<1.4 dt.

11. A liquid crystal display device according to claim 3,
wherein the thickness of said liquid crystal layer in said transmissive region is in a range of between 2.7 µm and 3.2 µm;
wherein the thickness of said liquid crystal layer in said reflective region is in a range of between 3.2 µm and 5.15 µm.

12. A liquid crystal display device according to claim 1, wherein the thickness of said liquid crystal layer in the reflective region is measured at a portion of the reflective region other than a portion of the reflective region corresponding to a through-hole.

13. A liquid crystal display device comprising:
a backlight;
a first substrate;
a second substrate;
a liquid crystal layer disposed between said first substrate and said second substrate;
a pixel electrode and a common electrode, disposed at least one of said first and second substrates to drive the liquid crystal layer;
a first polarizer provided on said first substrate on a side opposite to the liquid crystal layer; and
a second polarizer provided on said second substrate on a side opposite to the liquid crystal layer;
wherein a plurality of pixels are formed between said first and second substrates and each pixel is provided with a reflective region and a transmissive region;
wherein said second substrate is closer to said backlight than said first substrate;
wherein a step layer to differentiate the thickness of said liquid crystal layer between said transmissive region and said reflective region is disposed on said first substrate;
wherein said second substrate is closer to said backlight than said first substrate;
wherein, in said reflective region of said second substrate, a reflector and an in-cell polarizer are formed;
wherein the thickness of said liquid crystal layer is greater in the reflective region than in said transmissive region;
wherein said in-cell polarizer is disposed on said reflector and beneath said pixel electrode; and
wherein a passivation layer is formed between said in-cell polarizer and said pixel electrode.

14. A liquid crystal display device according to claim 13,
wherein a switching elemental device and a through-hole are provided;
wherein said pixel electrode is connected to said switching elemental device through said thorough-hole; and
wherein said thorough-hole passes through said in-cell polarizer.

15. A liquid crystal display device comprising:
a backlight;
a first substrate;
a second substrate;
a liquid crystal layer disposed between said first substrate and said second substrate;
a pixel electrode and a common electrode, disposed at least one of said first and second substrates to drive the liquid crystal layer;
a first polarizer provided on said first substrate on a side opposite to the liquid crystal layer; and
a second polarizer provided on said second substrate on a side opposite to the liquid crystal layer;
wherein a plurality of pixels are formed between said first and second substrates and each pixel is provided with a reflective region and a transmissive region;
wherein said second substrate is closer to said backlight than said first substrate;
wherein a step layer to differentiate the thickness of said liquid crystal layer between said transmissive region and said reflective region is disposed on said first substrate;
wherein said second substrate is closer to said backlight than said first substrate;
wherein, in said reflective region of said second substrate, a reflector and an in-cell polarizer are formed;
wherein the thickness of said liquid crystal layer is greater in the reflective region than in said transmissive region;
wherein said in-cell polarizer is disposed on said reflector and beneath said pixel electrode;
wherein a switching elemental device and a through-hole are provided;
wherein said pixel electrode is connected to said switching elemental device through said thorough-hole; and
wherein said thorough-hole passes through said in-cell polarizer.

16. A liquid crystal display device according to claim 15, wherein a passivation layer is formed between said in-cell polarizer and said pixel electrode.

* * * * *